US012587802B2

(12) United States Patent (10) Patent No.: US 12,587,802 B2
Kim et al. (45) Date of Patent: Mar. 24, 2026

(54) ELECTRONIC DEVICE FOR APPLYING DIRECTIONALITY TO AUDIO SIGNAL, AND METHOD THEREFOR

(71) Applicant: SAMSUNG ELECTRONICS CO., LTD., Suwon-si (KR)

(72) Inventors: Byeongjun Kim, Suwon-si (KR); Junsoo Lee, Suwon-si (KR); Jaehyun Kim, Suwon-si (KR); Sangju Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 11 days.

(21) Appl. No.: 18/241,130

(22) Filed: Aug. 31, 2023

(65) Prior Publication Data

US 2023/0413002 A1     Dec. 21, 2023

Related U.S. Application Data

(63) Continuation of application No. PCT/KR2022/002941, filed on Mar. 2, 2022.

(30) Foreign Application Priority Data

Mar. 2, 2021     (KR) ........................ 10-2021-0027626

(51) Int. Cl.
*H04S 7/00* (2006.01)
*G06V 20/40* (2022.01)
(Continued)

(52) U.S. Cl.
CPC .............. *H04S 7/302* (2013.01); *G06V 20/40* (2022.01); *G06V 40/10* (2022.01); *H04N 23/631* (2023.01)

(58) Field of Classification Search
CPC ..... H04N 23/631; G06F 3/165; G06F 3/0416; G06V 20/40; G06V 20/00; G06V 40/10;
(Continued)

(56) References Cited

U.S. PATENT DOCUMENTS 9,007,477 B2    4/2015  Ojala et al.
9,674,453 B1    6/2017  Tangeland et al.
(Continued)

FOREIGN PATENT DOCUMENTS

CN       110753238 A     2/2020
EP        2530957 A2    12/2012
(Continued)

OTHER PUBLICATIONS

Saudi Arabian Office Action for SA Application No. 523450493 mailed on Oct. 14, 2024.
(Continued)

*Primary Examiner* — Kelly L Jerabek
(74) *Attorney, Agent, or Firm* — CANTOR COLBURN LLP

(57)     ABSTRACT

An electronic device includes a communication module for supporting short-range wireless communication; a camera module for capturing a video; a display for displaying the video being captured; and a processor operatively connected to the communication module, camera module, and display. The processor may be configured to: connect with the external electronic device using the communication module; receive an audio signal from the external electronic device at the same time as the capturing of the video; confirm a target object among at least one object included in the video being captured; confirm first location information about the location at which the target object is displayed on the display; estimate, on the basis of the first location information, the actual location of the target object; generate second (Continued)

location information about the actual location; and process the audio signal on the basis of the generated second location information.

18 Claims, 12 Drawing Sheets

(51) Int. Cl.
  *G06V 40/10*          (2022.01)
  *H04N 23/63*          (2023.01)

(58) Field of Classification Search
  CPC . G06T 7/70; H04S 7/303; H04S 7/302; H04S 7/30; H04S 2400/11; H04S 2420/01; H04R 3/005
  See application file for complete search history.

(56)                References Cited

U.S. PATENT DOCUMENTS

| | | |
|---|---|---|
| 10,734,029 B2 | 8/2020 | Funakoshi |
| 11,012,774 B2 | 5/2021 | Sheaffer et al. |
| 2006/0023081 A1 | 2/2006 | Sekiguchi et al. |
| 2006/0227224 A1 | 10/2006 | Kawata et al. |
| 2010/0302401 A1 | 12/2010 | Oku et al. |
| 2012/0307048 A1 | 12/2012 | Abrahamsson et al. |
| 2015/0003648 A1 | 1/2015 | Kang |
| 2015/0341719 A1 | 11/2015 | Sun |
| 2015/0373477 A1 | 12/2015 | Norris et al. |
| 2016/0142830 A1 | 5/2016 | Hu |
| 2017/0156013 A1 | 6/2017 | Norris et al. |
| 2018/0091925 A1 | 3/2018 | Norris et al. |
| 2018/0109900 A1 | 4/2018 | Lyren et al. |
| 2018/0203559 A1 | 7/2018 | Choi |
| 2018/0279048 A1 | 9/2018 | Mattana |
| 2019/0222798 A1 | 7/2019 | Honma et al. |
| 2022/0116729 A1* | 4/2022 | Ukai ......................... G06T 7/70 |

FOREIGN PATENT DOCUMENTS

| | | |
|---|---|---|
| EP | 3349111 A1 | 7/2018 |
| JP | 2006314078 A | 11/2006 |
| JP | 2011130134 A | 6/2011 |
| JP | 5299034 B2 | 9/2013 |
| JP | 5801026 B2 | 10/2015 |
| JP | 2016051917 A | 4/2016 |
| JP | 2019029981 A | 2/2019 |
| JP | 6525029 B2 | 6/2019 |
| KR | 20100028326 A | 3/2010 |
| KR | 101410976 B1 | 6/2014 |
| KR | 20160002132 A | 1/2016 |
| KR | 101740569 B1 | 5/2017 |
| RU | 2531023 C2 | 10/2014 |
| WO | 2017208820 A1 | 12/2017 |

OTHER PUBLICATIONS

International Search Report for International Application No. PCT/KR2022/002941; International Filing Date Mar. 2, 2022; International Search Report Mail Date Jun. 10, 2022; 3 Pages.
European Search Report Issued in EP Application No. 22763581.0-1207, Mail Dated Jul. 3, 2024, 7 Pages.
Korean Office Action Issued In KR Application No. 10-2021-0027626; Mail Date Sep. 1, 2025; 12 Pages.
Russian Office Action Issued In RU Patent Application No. 2023122743/07(050060), Issue Date Jul. 3, 2025, 14 Pages.
Japanese Office Action Issued In JP Patent Application No. 2023-553375, Issue Date Dec. 9, 2025, 5 Pages.
Vietnam OA Issued In VA Patent Application No. 1-2023-05813, Issue Date Feb. 4, 2026, 4 Pages.

* cited by examiner

FIG. 1

FIG. 2
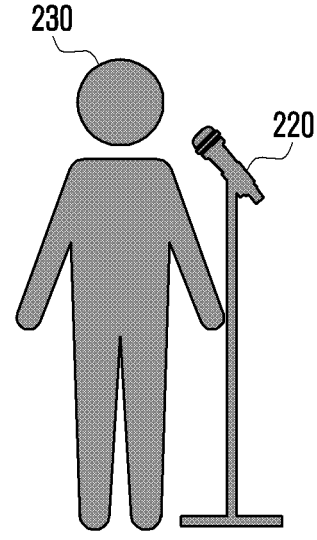
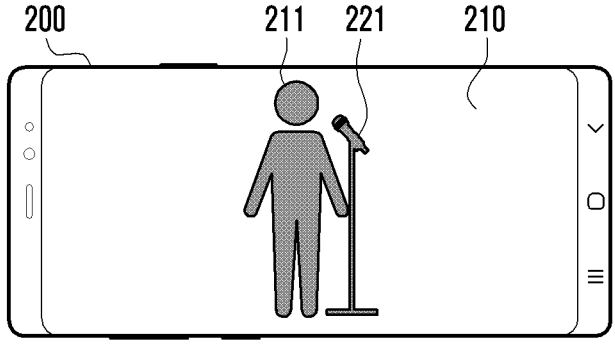

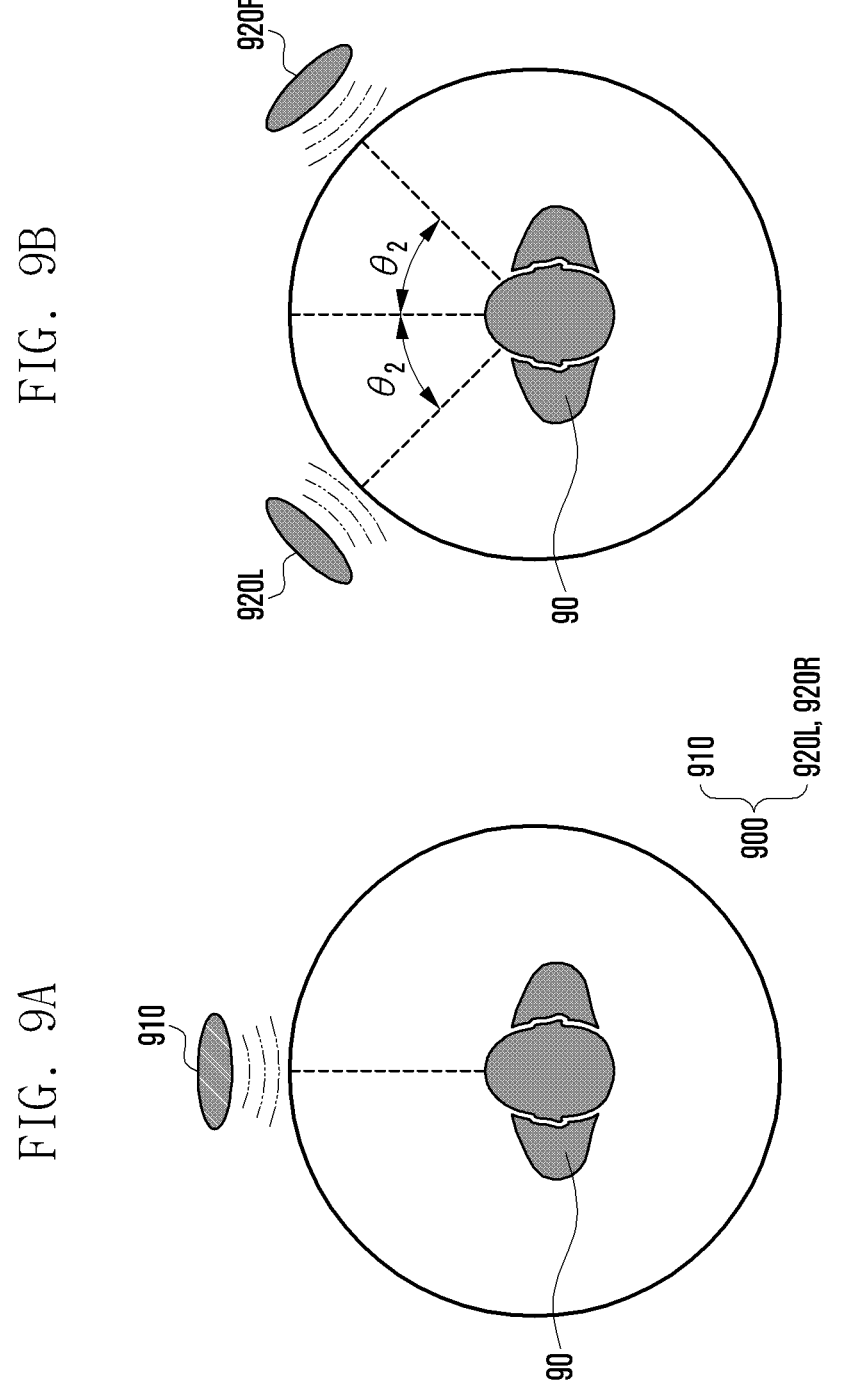

ELECTRONIC DEVICE FOR APPLYING DIRECTIONALITY TO AUDIO SIGNAL, AND METHOD THEREFOR

CROSS-REFERENCE TO RELATED APPLICATION(S)

This application is a continuation application, claiming priority under § 365(c), of International Application No. PCT/KR2022/002941, filed on Mar. 2, 2022, which is based on and claims the benefit of Korean patent application number 10-2021-0027626, filed on Mar. 2, 2021, in the Korean Intellectual Property Office, the disclosures of which are incorporated by reference herein in their entireties.

TECHNICAL FIELD

Various embodiments of the disclosure relate to a method of applying directionality to an audio signal obtained by an electronic device.

BACKGROUND ART

A stereo audio scheme is a sound providing method that uses two or more independent audio channels using a plurality of audio output configurations. The method may include stereo audio information in the same audio data, and may enable the plurality of audio output configurations to output different audio data using independent audio channels, respectively, so that listeners may experience a sense of realism.

A binaural audio scheme is a sound providing method that provides a binaural effect using a plurality of audio output configurations. The binaural audio effect may be an effect that enables a listener to experience perspective, a sense of realism, a sense of orientation, a sense of space, and a sense of acoustic field using a difference in intensity, a difference in time, and/or a difference in phase of sound heard by both ears of the listener.

DISCLOSURE OF INVENTION

Technical Problem

An audio signal which provides a sense of realism corresponding to a video image shot may need to be recorded while the video image is being shot. In case a video is shot using an electronic device, a sense of realism, a sense of orientation, and the like may need to be given to a background audio signal that is recorded. Specifically, in case an audio signal is collected using an external electronic device such as a wireless microphone or the like while a video is being shot, a single external electronic device is used in most cases. In case a single external electronic device shoots a video by collecting sound of an object, information associated with the directionality of the sound of the object is not present, and thus a recorded audio signal of the object may provide an effect as if sound would come from a predetermined direction, irrespective of whether the object is located to the left or the right of a screen displaying the shot object, or is located in any direction. In this instance, an audio signal may be recorded in mono, and the audio signal recorded in mono may be monotonous or may be difficult to provide a sense of realism and a sense of space. A method of providing a sense of realism, a sense of space, and the like using a voice recorded as a mono signal may be needed.

Solution to Problem

An electronic device according to various embodiments of the disclosure may include a communication module configured to support short-distance wireless communication, a camera module configured to shoot a video image, a display configured to display the video image being shot, and a processor operatively connected to the communication module, the camera module, and the display, and the processor is configured to establish a connection with an external electronic device using the communication module, to receive an audio signal from the external electronic device simultaneously with shooting the video image, to identify a target object that is a target among at least one object included in the video image being shot, to identify first location information related to a location at which the target object is displayed in the display, to estimate an actual location of the target object based on the first location information, produce second location information related to the actual location, and to process the audio signal based on the produced second location information.

A method of processing an audio signal by an electronic device according to various embodiments of the disclosure may include an operation of establishing a connection with an external electronic device, an operation of receiving an audio signal from the external electronic device simultaneously with shooting a video image, an operation of identifying a target object that is a target among at least one object included in the video image being shot, an operation of identifying first location information associated with a location at which the target object is displayed in a display of the electronic device, an operation of estimating an actual location of the target object based on the produced second location information, producing second location information related to the actual location, and processing the audio signal based on the produced second location information.

Advantageous Effects of Invention

According to various embodiments, an audio signal having a sense of realism and a sense of space may be produced, which corresponds to a shot video. User experience may be improved by providing sound with a sense of space that corresponds to a video image to a user.

In addition, various effects directly or indirectly recognized from the disclosure may be provided.

BRIEF DESCRIPTION OF DRAWINGS

In the descriptions of drawings, identical or like reference numerals in the drawings denote identical or like component elements.

FIG. 1 is a block diagram of an electronic device in a network environment according to various embodiments.

FIG. 2 is a diagram illustrating a video shot by an electronic device according to various embodiments.

FIGS. 9A and 9B are diagrams illustrating a stereo sound according to various embodiments.

MODE FOR THE INVENTION

Figure 1:
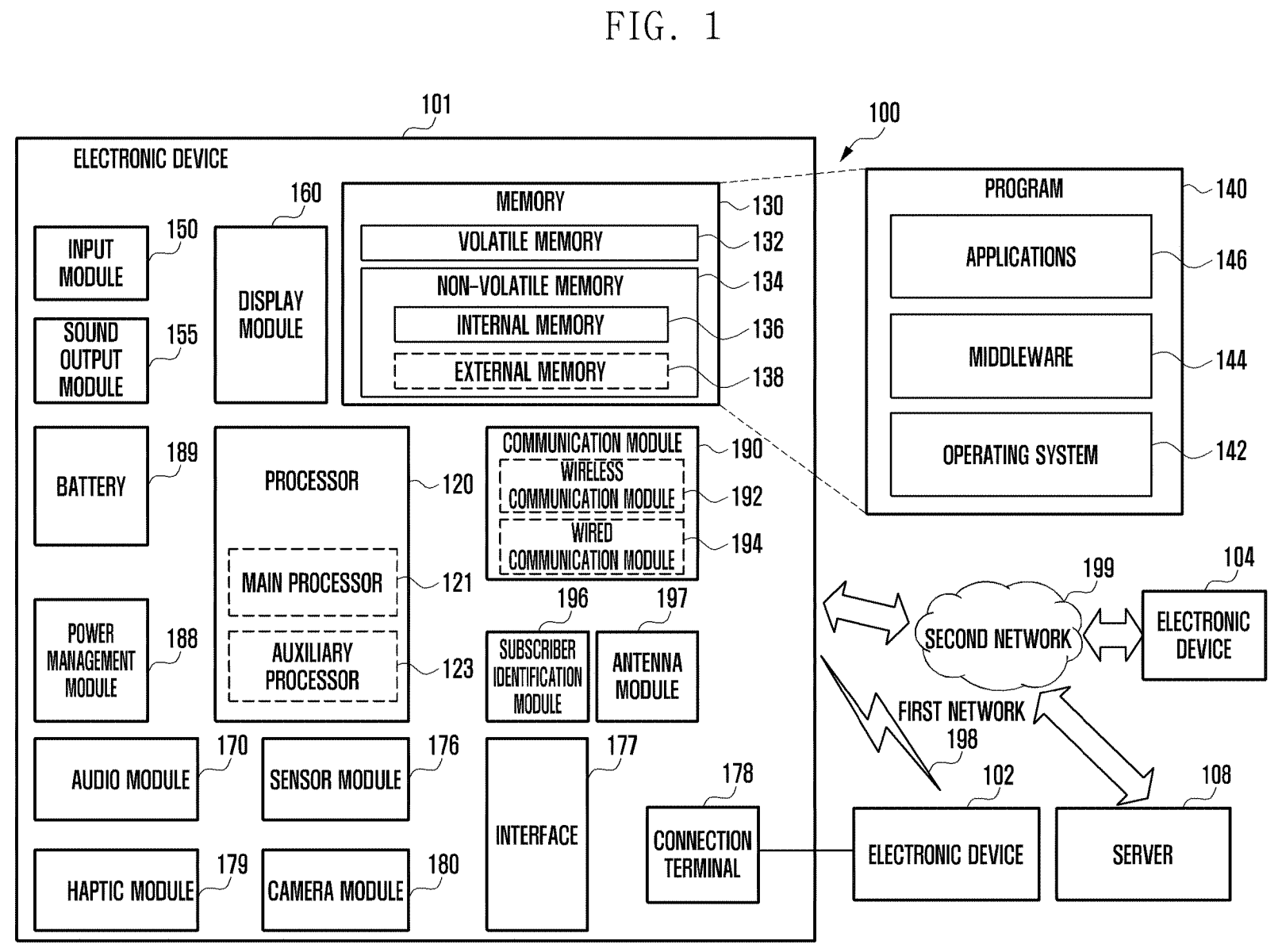
Figure 3:
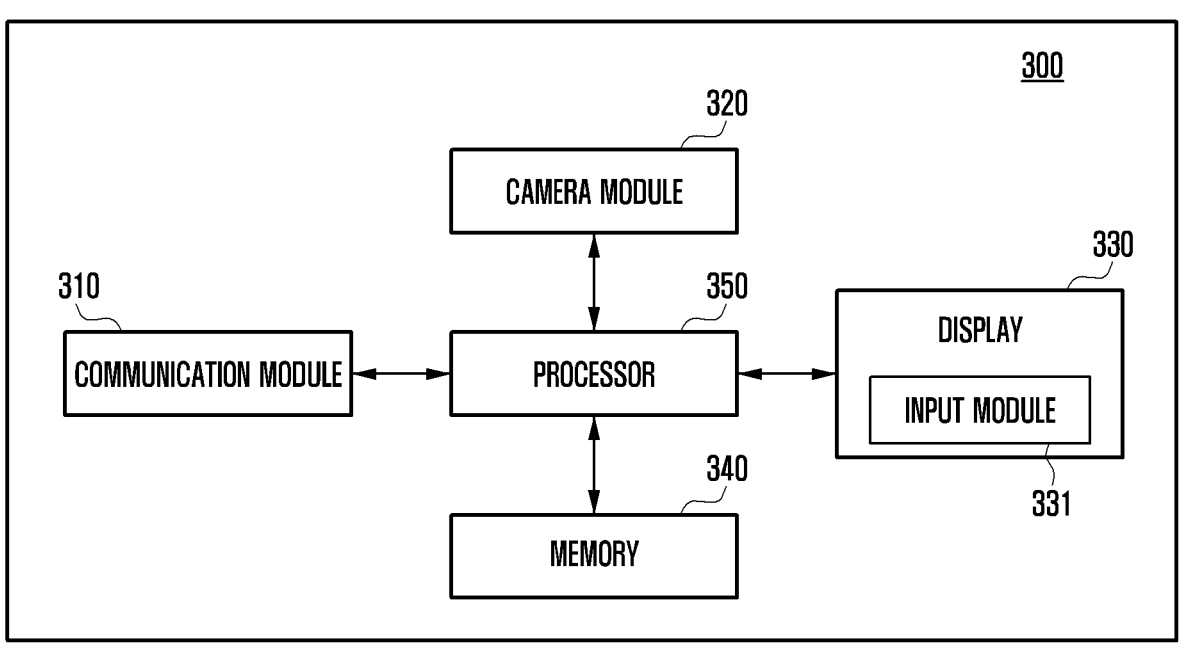
FIG. 3 is a block diagram of an electronic device according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a diagram illustrating a video shot by an electronic device 200 according to various embodiments.

Referring to FIG. 2, the electronic device 200 (e.g., the electronic device 101) may shoot images of various subjects (e.g., an external electronic device 220 and/or a person 230). According to various embodiments, the electronic device 200 may shoot at least one subject (e.g., the external electronic device 220 and/or the person 230) using a camera (e.g., a camera module 320 of FIG. 3) included in the electronic device 200. Various persons or objects, such as the person 230, a device (e.g., the external electronic device 220), and the like, may be used as subjects. The objects used as subjects are not limited, but for ease of description, descriptions will be provided with reference to the case that uses at least one person and/or at least one external electronic device as a subject, in the document.

According to various embodiments, the electronic device 200 may shoot a subject (e.g., the person 230 and/or the external electronic device 220) and may produce an image of the shot subject. According to various embodiments, the electronic device 200 may display the shot image in a display 210. According to an embodiment, the image shot by the electronic device 200 may be a video image. According to various embodiments, the electronic device 200 may display a video image in the display 210.

According to various embodiments, the electronic device 200 may configure a connection with the external electronic device 220. According to various embodiments, the electronic device 200 may establish a connection communicatively with the external electronic device 220. According to various embodiments, the electronic device 200 may establish a connection with the external electronic device 220 in a wired manner (e.g., direct communication) and/or using a wireless communication network (e.g., the first network 198 of FIG. 1). According to an embodiment, the electronic device 200 may connect the external electronic device 220 via short-distance wireless communication (e.g., Bluetooth). According to various embodiments, the electronic device 200 may transmit, to the external electronic device 220, data needed for establishing a communication connection and/or needed for performing a function, or may receive data from the external electronic device 220.

According to various embodiments, the electronic device 200 may obtain an audio signal. According to various embodiments, the electronic device 200 may obtain an audio signal corresponding to the background sound of an image when a video is shot. The electronic device 200 may receive input of a voice from the outside using a microphone (e.g., the input module 150 of FIG. 1) included in the electronic device 200, and may produce an audio signal. According to an embodiment, the electronic device 200 may receive an audio signal from the connected external electronic device 220. For example, the external electronic device 220 may produce an audio signal using collected voices, and may transmit the produced audio signal to the electronic device 200. The electronic device 200 may receive an audio signal from the external electronic device 220. According to an embodiment, the electronic device 200 may receive an audio signal of a voice corresponding to an image from the external electronic device 220 simultaneously with shooting the image. Referring to FIG. 2, a video image displayed by the electronic device 200 may include at least one object. The at least one object included in the video image, for example, a first object 211 that is an image object obtained by shooting the person 230 and/or a second object 221 that is an image object obtained by shooting the external electronic device 220. According to various embodiments, the electronic device 200 may analyze a shot video image or a video image and may identify at least one image object (e.g., the first object 211 and/or the second object 221) included in the video image. According to an embodiment, the electronic device 200 may analyze an image using an algorithm stored in advance in a memory (e.g., the memory 340 of FIG. 3), and may identify an object (e.g., the first object 211 and/or the second object 221) included in a video image via the image analysis. According to an embodiment, the electronic device 200 may analyze an image displayed in the display 210, and may identify an object (e.g., the first object 211 and/or the second object 221) included in the image. According to various embodiments, the electronic device 200 may identify information (e.g., coordinates) (e.g., first location information) related to a location at which each identified object (e.g., the first object 211 and/or the second object 221) is displayed in the display 210. According to various embodiments, the electronic device 200 may continuously identify coordinates (e.g., first location information) at which each identified object (e.g., the first object 211 and/or the second object 221) is displayed in the display 210. While shooting, the electronic device 200 may identify the coordinates (e.g., first location information) of an object (e.g., the first object 211 and/or the second object 221) that moves in real time in the display 210. According to various embodiments, the electronic device 200 may analyze a shot video image, and may identify an object corresponding to a target (e.g., a target object). The target object may be, for example, an object that the electronic device 200 desires to estimate the actual location thereof. According to various embodiments, the electronic device 200 may identify a target object using image analysis. According to an embodiment, the electronic device 200 may analyze a video image and may perform face recognition, and may identify a person object (e.g., the first object 211) based on a face recognition result. According to an embodiment, the electronic device 200 may identify the identified person object (e.g., the first object 211) as a target object. According to an embodiment, the electronic device 200 may identify an object (e.g., the second object 221) corresponding to the identified external electronic device 220 as a target object. According to an embodiment, the electronic device 200 may analyze a shot image and may identify a visual signal (e.g., a flickering LED signal), and may identify an object (e.g., the second object 221) corresponding to the external electronic device 220 as a target object. According to various embodiments, the electronic device 200 may store a condition for identifying a target object in a memory (e.g., the memory 340 of FIG. 3) in advance. According to an embodiment, the electronic device 200 may receive, from a user (not illustrated), a touch input to the display 210, and may identify a target object based on the received touch input. For example, an object corresponding to the location of a touch input among the at least one recognized object may be recognized as a target object. According to an embodiment, the electronic device 200 may produce sensor information using a sensor (e.g., the sensor module 176 of FIG. 1), may recognize the external electronic device 220 or the person 230 based on the sensor information, and may identify a target object based on a recognition result. According to an embodiment, the electronic device 200 may receive information related to the location of the external electronic device 200 using communication with the external electronic device 220, and may store the received location information. According to various embodiments, the electronic device 200 may identify a target object based on at least one of analysis of a shot video image, analysis of a received touch input, sensor information, and received location information.

According to various embodiments, the electronic device 200 may identify a location (e.g., first location information) at which a target object is displayed in the display 210. According to an embodiment, in the display 210, the electronic device 200 may identify the locations (e.g., first location information) of all objects (e.g., the first object 211 and the second object 221) in the display 210. According to an embodiment, the electronic device 200 may identify a location (first location information) of a target object (e.g., the first object 211 or the second object 221) in the display 210 among at least one image object (e.g., the first object 211 and/or the second object 221) displayed in the display 210. First location information may be information associated with a location at which a target object is displayed in the display 210. According to an embodiment, the first location information may be information expressed as predetermined coordinates in the display 210. According to an embodiment, the first location information may be information that varies in real time while the electronic device 200 is shooting a video. According to an embodiment, the electronic device 200 may continuously and/or immediately identify the first location information while shooting a video.

According to various embodiments, the electronic device 200 may identify additional information. The additional information may be information used for estimating information (e.g., second location information) related to an actual location of a subject (e.g., the external electronic device 220 or the person 230) corresponding to a target object, other than the first location information. The additional information may include information configured in a camera (e.g., the camera module 320 of FIG. 3) included in the electronic device 200. According to various embodiments, the additional information may include information related to a state and/or configuration of a camera (e.g., the camera module 320) such as a field of view (FOV) and/or a magnification of the electronic device 200 that is performing shooting. According to an embodiment, the camera (e.g., the camera module 320 of FIG. 3) may include a depth camera capable of measuring a distance, and may measure a distance between the electronic device 200 and a target object. According to an embodiment, the additional information may include distance information associated with the distance between the electronic device 200 and a target object. According to an embodiment, the additional information may include the size of a target object. According to an embodiment, the electronic device 200 may identify the range of an area of a display corresponding to an image of a target object, and may identify the size of the target object (e.g., a length and/or an area).

According to various embodiments, the electronic device 200 may estimate the location of a subject (e.g., the person 230 and/or the external electronic device 220). According to an embodiment, the electronic device 200 may estimate actual locations of subjects (e.g., the person 230 and the external electronic device 220) corresponding to all objects (e.g., the first object 211 and the second object 221) included in a shot video image. According to an embodiment, the electronic device 200 may estimate only an actual location of a subject (e.g., the person 230 and/or the external electronic device 220) corresponding to a target object. According to an embodiment, the electronic device 200 may estimate an actual location of a subject corresponding to a target object, and may produce second location information related to the estimated location. According to various embodiments, the electronic device 200 may produce the second location information based on the first location information. According to an embodiment, the electronic device 200 may identify a location (e.g., first location information) of a shot image object (e.g., a target object) in the display 210, and may estimate an actual location (e.g., second location information) based on the location in the display 210. According to various embodiments, the electronic device 200 may estimate second location information based on additional information. According to an embodiment, the electronic device 200 may estimate an actual location of a subject (e.g., the person 230 and/or the external electronic device 220) using first location information of a target object and additional information. According to an embodiment, an actual location estimated by the electronic device 200 may be a location of a subject (e.g., the person 230 or the external electronic device 220) relative to the location of the electronic device 200. According to an embodiment, the electronic device 200 may produce second location information based on sensor information produced via a prepared sensor. For example, the electronic device 200 may identify a distance to a target object using a distance measurement sensor such as an infrared ray sensor, and may produce second location information based on the identified distance. According to an embodiment, the electronic device 200 may receive location information of the external electronic device 220 from the external electronic device 220, and may produce second location information based on the received location information. According to an embodiment, the second location information may be one-dimensional location information that expresses only a location biased to the left or the right, or may include the forward or backward position (e.g., a distance) relative to the electronic device 200, or may be three-dimensional location information that expresses only a location biased to the upper position or lower position relative to the electronic device 200. According to various embodiments, the second location information may include at least one of the forward or backward position, the left or right position, and the upper or lower position of a subject, or a combination thereof (e.g., a one-dimensional location, two-dimensional location, or a three-dimensional location).

According to various embodiments, the electronic device 200 may process an audio signal based on the second location information. Processing of an audio signal may be an operation of allocating directionality to an obtained audio signal. Processing of an audio signal may include, for example, change and/or conversion of an audio signal. According to an embodiment, the electronic device 200 may perform panning of an obtained audio signal to convert the same into a stereo audio signal. According to an embodiment, the electronic device 200 may perform rendering of an obtained audio signal, to convert the same into three-dimensional sound (e.g., binaural sound) that provides a sense of space, a sense of position, and/or a sense of orientation. According to an embodiment, the electronic device 200 may process an audio signal to provide a sense of distance by adjusting the volume of an obtained audio signal. According to various embodiments, the electronic device 200 may process a single audio signal to produce a signal (a left audio signal) that a listener may listen to via the left ear and a signal (a right audio signal) that the listener may listen to via the right ear, respectively. According to an embodiment, the electronic device 200 may process an audio signal by producing at least one of a difference in intensity, a difference in time, and a difference in phase between the sound of a left audio signal and a right audio signal.

Referring to FIG. 2, the external electronic device 220 may establish a connection communicatively to the electronic device 200. According to an embodiment, the external electronic device 220 may transmit an audio signal to the electronic device 200. According to an embodiment, the external electronic device 220 may receive input of a voice and may produce an audio signal using the input voice. According to an embodiment, the electronic device 220 may equipped with a sensor to produce sensor information, and may transmit the produced sensor information to the electronic device 200. According to an embodiment, the external electronic device 220 may transmit a signal (e.g., a ultra wide band (UWB) signal) indicating a location to the electronic device 200. According to an embodiment, the external electronic device 220 may identify a location of the external electronic device 220 and may produce location information, and may transmit the produced location information to the electronic device 200.

FIG. 3 is a block diagram of an electronic device according to various embodiments.

Referring to FIG. 3, an electronic device 300 (e.g., the electronic device 101 of FIG. 1 and/or the electronic device 200 of FIG. 2) may include a communication module 310, a camera module 320, a display 330, a memory 340, and a processor 350. The electronic device 300 may include at least part of the configuration and/or functions of the electronic device 101 of FIG. 1.

According to various embodiments, the communication module 310 may communicate with an external electronic device (e.g., the external electronic device 220 of FIG. 2) via wired and/or wireless network communication (e.g., the first network 198 or the second network 199 of FIG. 1). Long-distance communication supported by the communication module 310 is not limited and various types of communication schemes (e.g., Bluetooth, UWB) may be supported. According to various embodiments, the communication module 310 may support short-distance wireless communication (e.g., Bluetooth, Bluetooth low energy (BLE), wireless fidelity (WiFi) direct, and/or ultra wide band (UWB)), and may transmit information to the external electronic device 220 via short-distance wireless communication. According to various embodiments, the communication module 310 may perform unidirectional or bidirectional communication with the external electronic device 220. The unidirectional communication may be limited to, for example, transmission of information to another electronic device, and transmission of information may be performed by simply outputting a predetermined signal to the outside.

According to various embodiments, the camera module 320 may shoot an image and/or a video of an external environment of the electronic device 300. The communication module 320 may include at least part of the configuration and/or functions of the communication module 180 of FIG. 1. According to various embodiments, the camera module 320 may convert light incident from the outside into an electrical signal, and may produce image information. According to various embodiments, the camera module 320 may shoot an external environment of the electronic device 300, and may produce a video image of the shot external environment. According to an embodiment, the camera module 320 may shoot a subject (e.g., the person 230 and/or the external electronic device 220 of FIG. 2) and may produce a digital image of the shot subject. According to an embodiment, the camera module 320 may include a depth camera capable of measuring a distance.

According to various embodiments, the display 330 may display information in an external side of the electronic device 300. The display 330 may include at least part of the configuration and/or functions of the display module 160 of FIG. 1. According to various embodiments, the display 330 may include a display panel, and may visually display information received from the processor 350. According to various embodiments, the display 330 may include an input module 331. According to an embodiment, the display 330 may include a touch sensor and/or a pressure sensor, and may receive a user touch input.

According to various embodiments, the memory 340 is to temporarily or permanently store digital data, and may include at least part of the configuration and/or functions of the memory 130 of FIG. 1. In addition, the memory 340 may store at least part of the program 140 of FIG. 1. The memory 340 may store various instructions executable by the processor 350. Such the instructions may include control commands, such as logic operation, data input and output, and the like, which may be recognized by the processor 350. Although the type and/or the amount of data that the memory 340 is capable of storing is not limited, the document will provide descriptions associated with a method of processing an audio signal according to various embodiments and the configuration and functions of a memory related to operation of the processor 350 that performs the method.

According to various embodiments, the processor 350 may process data or an operation related to communication and/or control of each component element of the electronic device 300. The processor 350 may include at least part of the configuration and/or functions of the processor 120 of FIG. 1. The processor may be operatively, electrically, and/or functionally connected to component elements of the electronic device 300, such as the communication module 310, the camera module 320, the display 330, and the memory 340. Each operation of the processor 350 according to various embodiments may be performed in real time. For example, a series of calculations and/or operations that the processor 350 performs for processing an audio signal may be performed sequentially or parallel, within a significantly small range of time. Although the type and/or the amount of operation, calculation, and data processing that the processor 350 is capable of performing is not limited, the document will only provide descriptions associated with a method of processing an audio signal according to various embodiments and the configuration and functions of the processor 350 related to operation that performs the method.

According to various embodiments, the processor 350 may shoot a video and may receive an audio signal. The processor 350 may shoot images of various subjects (e.g., the external electronic device 220 of FIG. 2 and/or the person 230). According to various embodiments, the processor 350 may shoot at least one subject (e.g., the external electronic device 220 and/or the person 230) using the camera module 320. Various objects, such as the person 230, a device (e.g., the external electronic device 220), and the like, may be used as subjects. The objects used as subjects are not limited, but for ease of description, descriptions will be provided with reference to the case that uses at least one person and/or at least one external electronic device as a subject, in the document. According to various embodiments, the processor 350 may shoot a subject (e.g., the person 230 and/or the external electronic device 220) and may produce an image of the shot subject. According to various embodiments, the processor 350 may display a shot image in the display 330 (e.g., the display 210). According to an embodiment, the image shot by the processor 350 may be a video image. According to various embodiments, the processor 350 may display, in the display 330, a video image.

According to various embodiments, the processor 350 may configure a connection with an external electronic device (e.g., the external electronic device 220 of FIG. 2). According to various embodiments, the processor 350 may establish a connection communicatively with the external electronic device 220. According to various embodiments, the processor 350 may establish a connection with the external electronic device 220 in a wired manner (e.g., direct communication) and/or using a wireless communication network (e.g., the first network 198 of FIG. 1). According to an embodiment, the processor 350 may connect the external electronic device 220 via short-distance wireless communication (e.g., Bluetooth). According to various embodiments, the processor 350 may transmit, to the external electronic device 220, data needed for establishing a communication connection and/or needed for performing a function, or may receive data from the external electronic device 220.

According to various embodiments, the processor 350 may obtain an audio signal. According to various embodiments, the processor 350 may obtain an audio signal corresponding to background sound of an image when a video is shot. The processor 350 may receive input of a voice from the outside using a microphone (e.g., the input module 150 of FIG. 1) included in the processor 350, and may produce an audio signal. According to an embodiment, the processor 350 may receive an audio signal from the connected external electronic device 220. For example, the external electronic device 220 may produce an audio signal using collected voices, and may transmit the produced audio signal to the processor 350. The processor 350 may receive an audio signal from the external electronic device 220. According to an embodiment, the processor 350 may receive an audio signal of a voice corresponding to an image from the external electronic device 220, simultaneously with shooting an image. According to an embodiment, the audio signal that the processor 350 receives from the external electronic device 220 may be mono sound.

According to various embodiments, the processor 350 may identify a target object. According to various embodiments, the processor 350 may analyze a shot video image, and may identify an object (e.g., a target object) corresponding to a target. The target object may be, for example, an object that the processor 350 desires to estimate the actual location thereof. According to various embodiments, the processor 350 may display a shot video image in the display 330. The video image that the processor 350 displays may include at least one object. The at least one object included in the video image, for example, a first object 211 (e.g., the first object 211 of FIG. 2) that is an image object obtained by shooting a person (e.g., the person 230 of FIG. 2) and/or a second object (e.g., the second object 221 of FIG. 2) that is an image object obtained by shooting the external electronic device 220. According to various embodiments, the processor 350 may analyze a shot video image or a video image and may identify at least one image object (e.g., the first object 211 and/or the second object 221 of FIG. 2) included in the video image. According to an embodiment, the processor 350 may analyze an image using an algorithm stored in advance in the memory 340 and may identify an object (e.g., the first object 211 and/or the second object 221) included in a video image via the image analysis. According to an embodiment, the processor 350 may analyze an image displayed in the display 210, and may identify an object (e.g., the first object 211 and/or the second object 221) included in the image.

According to various embodiments, the processor 350 may identify a target object using image analysis. According to an embodiment, the processor 350 may analyze a video image and may perform face recognition, and may identify a person object (e.g., the first object 211) based on a face recognition result. According to an embodiment, the processor 350 may identify the identified person object (e.g., the first object 211) as a target object. According to an embodiment, the processor 350 may identify an object (e.g., the second object 221) corresponding to the identified external electronic device 220 as a target object. According to an embodiment, the processor 350 may analyze a shot image and may identify a visual signal (e.g., a flickering LED signal), and may identify an object (e.g., the second object 221) corresponding to the external electronic device 200 as a target object. According to various embodiments, the processor 350 may store a condition for identifying a target object in a memory (e.g., the memory 340 of FIG. 3) in advance. According to an embodiment, the processor 350 may receive, from a user (not illustrated), a touch input to the display 210, and may identify a target object based on the received touch input. For example, an object corresponding to the location of a touch input among the at least one recognized object may be recognized as a target object. According to an embodiment, the processor 350 may produce sensor information using a sensor (e.g., the sensor module 176 of FIG. 1), may recognize the external electronic device 220 or the person 230 based on the sensor information, and may identify a target object based on a recognition result. According to an embodiment, the processor 350 may receive information related to the location of the external electronic device 200 using communication with the external electronic device 220, and may store the received location information. According to various embodiments, the processor 350 may identify a target object based on at least one of analysis of a shot video image, analysis of a received touch input, sensor information, and received location information.

According to various embodiments, the processor 350 may identify first information and additional information. The first location information may be information related to a location at which the target object is displayed in the display 210. According to an embodiment, the first location information may be information expressed as predetermined coordinates in the display 210. According to various embodiments, the processor 350 may identify information (e.g., coordinates) (e.g., first location information) associated with a location at which each identified object (e.g., the first object 211 and/or the second object 221) is displayed in the display 210. According to various embodiments, the processor 350 may continuously identify coordinates (e.g., first location information) at which each identified object (e.g., the first object 211 and/or the second object 221) is displayed in the display 210. While performing shooting, the processor 350 may identify the coordinates (e.g., first location information) of an object (e.g., the first object 211 and/or the second object 221) that moves in real time in the display 210. According to an embodiment, the first location information may be information that varies in real time while the processor 350 is shooting a video. According to an embodiment, the processor 350 may continuously and immediately identify the first location information while shooting a video. According to various embodiments, the processor 350 may identify a location (e.g., first location information) at which the target object is displayed in the display 210. According to an embodiment, in the display 210, the processor 350 may identify the locations (e.g., first location information) of all objects (e.g., the first object 211 and the second object 221) existing in the display 210. According to an embodiment, the processor 350 may identify a location (first location information) of a target object (e.g., the first object 211 or the second object 221) in the display 210 among at least one image object (e.g., the first object 211 and/or the second object 221) displayed in the display 210.

According to various embodiments, the processor 350 may identify additional information. The additional information may be information used for estimating information (e.g., second location information) related to an actual location of a subject (e.g., the external electronic device 220 or the person 230) corresponding to a target object, other than the first location information. The additional information may include information configured in the camera 320 included in the electronic device 300. According to various embodiments, the additional information may include information related to a state and/or configuration of the camera module 320, such as a field of view (FOV) and/or a magnification of the processor 350 that is performing shooting. According to an embodiment, a distance between the processor 350 and a target object may be measured. According to an embodiment, the additional information may include distance information associated with a distance between the electronic device 300 and the target object. According to an embodiment, the additional information may include the size of a target object. According to an embodiment, the processor 350 may identify the range of an area of a display that corresponds to an image of a target object, and may identify the size of the target object (e.g., a length and/or an area).

According to various embodiments, the processor 350 may produce second location information. The second location information may be information related to an actual location of a subject (e.g., the person 230 and/or the external electronic device 220 of FIG. 2). According to various embodiments, the processor 350 may estimate the location of a subject (e.g., the person 230 and/or the external electronic device 220 of FIG. 2). According to an embodiment, the processor 350 may estimate actual locations of subjects (e.g., the person 230 and the external electronic device 220) corresponding to all objects (e.g., the first object 211 and the second object 221) included in a shot video image. According to an embodiment, the processor 350 may estimate only an actual location of a subject (e.g., the person 230 or the external electronic device 220) corresponding to a target object. According to an embodiment, the processor 350 may estimate an actual location of a subject corresponding to a target object, and may produce second location information related to the estimated location. According to various embodiments, the processor 350 may produce the second location information based on the first location information. According to an embodiment, the processor 350 may identify a location (e.g., first location information) of a shot image object (e.g., a target object) in the display 210, and may estimate an actual location (e.g., second location information) based on the location in the display 210. According to various embodiments, the processor 350 may estimate the second location information based on the additional information. According to an embodiment, the processor 350 may estimate an actual location of a subject (e.g., the person 230 and/or the external electronic device 220) using the first location information of a target object and the additional information. According to an embodiment, an actual location estimated by the processor 350 may be a location of a subject (e.g., the person 230 or the external electronic device 220) relative to the location of the processor 350. According to an embodiment, the processor 350 may produce the second location information based on sensor information produced by a sensor (e.g., the sensor module 176 of FIG. 1) included in the electronic device 300. According to an embodiment, the processor 350 may receive location information of the external electronic device 220 from the external electronic device 220, and may produce the second location information based on the received location information. According to an embodiment, the second location information may be one-dimensional location information that expresses only a location biased to the left or the right, or may include the forward or backward position (e.g., a distance) relative to the processor 350, or may be three-dimensional location information that expresses a location biased to the upper or lower position relative to the processor

350. According to various embodiments, the second location information may include at least one of the forward or backward position, the left or right position, and the upper or lower position in association with a subject, or a combination thereof.

According to various embodiments, the processor 350 may process an audio signal based on the second location information. Processing of an audio signal may be an operation of allocating directionality to an obtained audio signal. Processing of an audio signal may include, for example, change and/or conversion of an audio signal. According to an embodiment, the processor 350 may perform panning of an obtained audio signal, and may convert the same into a stereo audio signal. According to an embodiment, the processor 350 may perform rendering of an obtained audio signal, and may convert the same Into three-dimensional sound (e.g., binaural sound) that provides a sense of space, a sense of position, and/or a sense of orientation. According to an embodiment, the processor 350 may process an audio signal to provide a sense of distance by adjusting the volume of an obtained audio signal. According to various embodiments, the processor 350 may process a single audio signal and may produce a signal (a left audio signal) that a listener listens to via the left ear and a signal (a right audio signal) that the listener listens to via the right ear, respectively. According to an embodiment, the processor 350 may process an audio signal by producing at least one of a difference in intensity, a difference in time, and a difference in phase between the sound of the left audio signal and the right audio signal.

Figure 4:
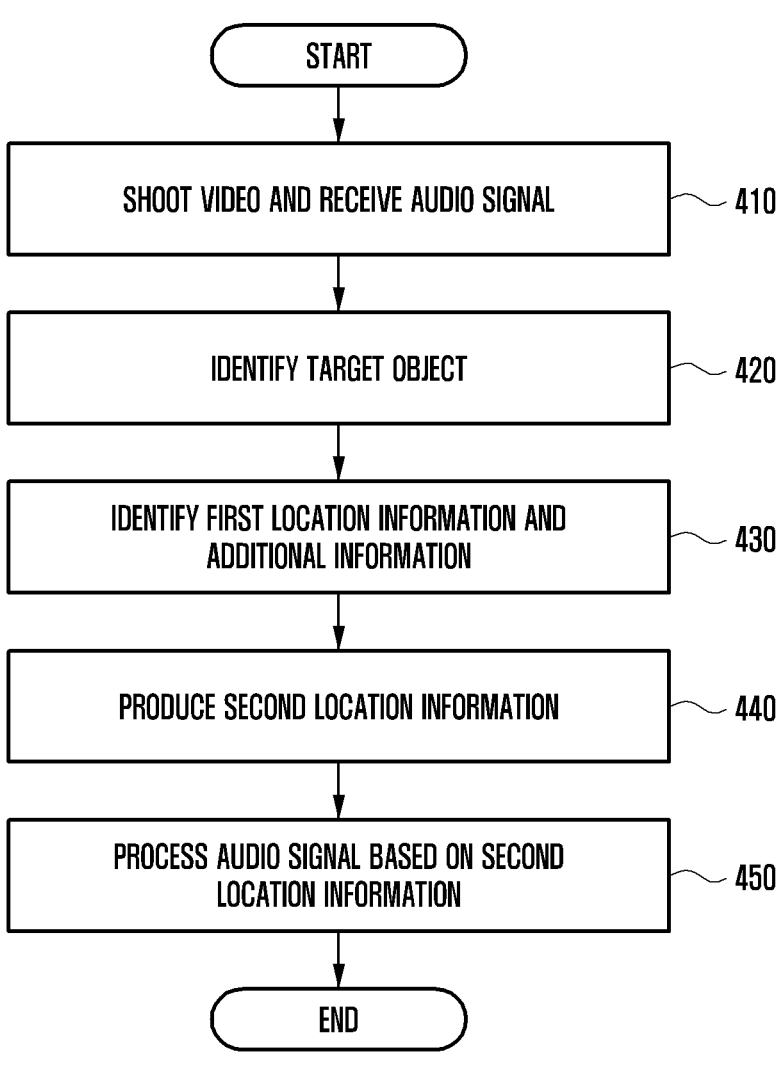
FIG. 4 is a flowchart illustrating operation of applying directionality to an audio signal by an electronic device according to various embodiments.

FIG. 4 is a flowchart illustrating operation of applying directionality to an audio signal by an electronic device according to various embodiments.

Referring to FIG. 4, each of a series of operations that an electronic device (e.g., the electronic device 300 of FIG. 3) performs to process an audio signal may be expressed as an operation performed by a processor (e.g., the processor 350 of FIG. 3) included in the electronic device 300.

Referring to operation 410, the processor 350 may shoot a video and may receive an audio signal. The processor 350 may shoot images of various subjects (e.g., the external electronic device 220 and/or the person 230 of FIG. 2). According to various embodiments, the processor 350 may shoot at least one subject (e.g., the external electronic device 220 and/or the person 230) using a camera module (e.g., the camera module 320 of FIG. 3). Various objects, such as the person 230, a device (e.g., the external electronic device 220), and the like, may be used as subjects. The objects used as subjects are not limited, but for ease of description, descriptions will be provided with reference to the case that uses at least one person and/or at least one external electronic device as a subject, in the document. According to various embodiments, the processor 350 may shoot a subject (e.g., the person 230 and/or the external electronic device 220) and may produce an image of the shot subject. According to various embodiments, the processor 350 may display the shot image in a display (e.g., the display 330 of FIG. 3). According to an embodiment, the image shot by the processor 350 may be a video image. According to various embodiments, the processor 350 may display a video image in the display 330. According to various embodiments, the processor 350 may configure a connection with an external electronic device (e.g., the external electronic device 220 of FIG. 2). According to various embodiments, the processor 350 may establish a connection communicatively with the external electronic device 220. According to various embodiments, the processor 350 may establish a connection with the external electronic device 220 in a wired manner (e.g., direct communication) and/or using a wireless communication network (e.g., the first network 198 of FIG. 1). According to an embodiment, the processor 350 may connect the external electronic device 220 via short-distance wireless communication (e.g., Bluetooth). According to various embodiments, the processor 350 may transmit, to the external electronic device 220, data needed for establishing a communication connection and/or needed for performing a function, or may receive data from the external electronic device 220. According to various embodiments, the processor 350 may obtain an audio signal. According to various embodiments, in case of shooting a video, the processor 350 may obtain an audio signal corresponding to background sound of an image. The processor 350 may receive input of a video from the outside using a microphone (e.g., the input module 150 of FIG. 1) included in the processor 350, and may produce an audio signal. According to an embodiment, the processor 350 may receive an audio signal from the connected external electronic device 220. For example, the external electronic device 220 may produce an audio signal using collected voices, and may transmit the produced audio signal to the processor 350. The processor 350 may receive an audio signal from the external electronic device 220. According to an embodiment, the processor 350 may receive an audio signal of a voice corresponding to an image from the external electronic device 220, simultaneously with shooting an image. According to an embodiment, the audio signal that the processor 350 receives from the external electronic device 220 may be mono sound.

In operation 420, the processor 350 may identify a target object. According to various embodiments, the processor 350 may analyze the shot video image, and may identify an object (e.g., a target object) corresponding to a target. The target object may be, for example, an object that the processor 350 desires to estimate the actual location thereof. According to various embodiments, the processor 350 may display the shot video image in the display 330. The video image that the processor 350 displays may include at least one object. The at least one object included in the video image, for example, a first object (e.g., the first object 211 of FIG. 2) that is an image object obtained by shooting a person (e.g., the person 230 of FIG. 2) and/or a second object (e.g., the second object 221 of FIG. 2) that is an image object obtained by shooting the external electronic device 220. According to various embodiments, the processor 350 may analyze a shot video image or a video image and may identify at least one image object (e.g., the first object 211 and/or the second object 221 of FIG. 2) included in the video image. According to an embodiment, the processor 350 may analyze an image using an algorithm stored in advance in a memory (e.g., the memory 340 of FIG. 3), and may identify an object (e.g., the first object 211 and/or the second object 221) included in a video image via the image analysis. According to an embodiment, the processor 350 may analyze an image displayed in the display 210, and may identify an object (e.g., the first object 211 and/or the second object 221) included in the image.

According to various embodiments, the processor 350 may identify s target object using image analysis. According to an embodiment, the processor 350 may analyze a video image and may perform face recognition, and may identify a person object (e.g., the first object 211) based on a face recognition result. According to an embodiment, the processor 350 may identify the identified person object (e.g., the first object 211) as a target object. According to an embodiment, the processor 350 may identify an object (e.g., the second object 221) corresponding to the identified external electronic device 220 as a target object. According to an embodiment, the electronic device 350 may analyze a shot image and may identify a visual signal (e.g., a flickering LED signal), and may identify an object (e.g., the second object 221) corresponding to the external electronic device 200 as a target object. According to various embodiments, the processor 350 may store a condition for identifying a target object in a memory (e.g., the memory 340 of FIG. 3) in advance. According to an embodiment, the processor 350 may receive a touch input from a user (not illustrated) via the display 210, and may identify a target object based on the received touch input. For example, an object corresponding to the location of a touch input among the at least one recognized object may be recognized as a target object. According to an embodiment, the processor 350 may produce sensor information using a sensor (e.g., the sensor module 176 of FIG. 1), may recognize the external electronic device 220 or the person 230 based on the sensor information, and may identify a target object based on a recognition result. According to an embodiment, the processor 350 may receive information related to the location of the external electronic device 200 using communication with the external electronic device 220, and may store the received location information. According to various embodiments, the processor 350 may identify a target object based on at least one of analysis of a shot video image, analysis of a received touch input, sensor information, and received location information.

Referring to operation 430, the processor 350 may identify first information and additional information. The first location information may be information associated with a location at which a target object is displayed in the display 210. According to an embodiment, the first location information may be information expressed as predetermined coordinates in the display 210. According to various embodiments, the processor 350 may identify information (e.g., coordinates) (e.g., first location information) associated with a location at which each identified object (e.g., the first object 211 and/or the second object 221) is displayed in the display 210. According to various embodiments, the processor 350 may continuously identify coordinates (e.g., first location information) at which each identified object (e.g., the first object 211 and/or the second object 221) is displayed in the display 210. While performing shooting, the processor 350 may identify the coordinates (e.g., first location information) of an object (e.g., the first object 211 and/or the second object 221) that moves in real time in the display 210. According to an embodiment, the first location information may be information that varies in real time while the processor 350 is shooting a video. According to an embodiment, the processor 350 may continuously and immediately identify the first location information while shooting a video. According to various embodiments, the processor 350 may identify a location (e.g., first location information) at which a target object is displayed in the display 210. According to an embodiment, in the display 210, the processor 350 may identify the locations (e.g., first location information) of all objects (e.g., the first object 211 and the second object 221) existing in the display 210. According to an embodiment, the processor 350 may identify a location (first location information) of a target object (e.g., the first object 211 or the second object 221) in the display 210 among at least one image object (e.g., the first object 211 and/or the second object 221) displayed in the display 210.

According to various embodiments, the processor 350 may identify the additional information. The additional information may be information used for estimating information (e.g., second location information) related to an actual location of a subject (e.g., the external electronic device 220 or the person 230) corresponding to a target object, other than the first location information. The additional information may include information configured in a camera module (e.g., the camera module 320 of FIG. 3) included in the electronic device 300. According to various embodiments, the additional information may include information related to a state and/or configuration of the camera module 320, such as a field of view (FOV) and/or a magnification of the processor 350 that is performing shooting.

In operation 440, the processor 350 may produce second location information. The second location information may be information related to an actual location of a subject (e.g., the person 230 and/or the external electronic device 220 of FIG. 2). According to various embodiments, the processor 350 may estimate the location of a subject (e.g., the person 230 and/or the external electronic device 220 of FIG. 2). According to an embodiment, the processor 350 may estimate actual locations of subjects (e.g., the person 230 and the external electronic device 220) corresponding to all objects (e.g., the first object 211 and the second object 221) included in the shot video image. According to an embodiment, the processor 350 may estimate only an actual location of a subject (e.g., the person 230 and/or the external electronic device 220) corresponding to a target object. According to an embodiment, the processor 350 may estimate an actual location of the subject corresponding to the target object, and may produce second location information related to the estimated location. According to various embodiments, the processor 350 may produce the second location information based on the first location information. According to an embodiment, the processor 350 may identify a location (e.g., first location information) of a shot image object (e.g., a target object) in the display 210, and may estimate an actual location (e.g., second location information) based on the location in the display 210. According to various embodiments, the processor 350 may produce the second location information based on additional information. According to an embodiment, the processor 350 may estimate an actual location of a subject (e.g., the person 230 and/or the external electronic device 220) using the first location information of a target object and additional information. According to an embodiment, an actual location estimated by the processor 350 may be a location of a subject (e.g., the person 230 or the external electronic device 220) relative to the location of the processor 350. According to an embodiment, the processor 350 may produce the second location information based on sensor information produced by a sensor (e.g., the sensor module 176 of FIG. 1) included in the electronic device 300. According to an embodiment, the processor 350 may receive location information of the external electronic device 220 from the external electronic device 220, and may produce the second location information based on the received location information. According to an embodiment, the second location information may be one-dimensional location information that expresses only a location biased to the left or the right, or may include the forward or backward position (e.g., a distance) relative to the processor 350, or may be three-dimensional location information that expresses a location biased to the upper or lower position relative to the processor 350. According to various embodiments, the second location information may include at least one of the forward or backward position, the left or right position, and the upper or lower position in association with a subject, or a combination thereof.

Referring to operation 450, the processor 350 may process the audio signal based on the second location information. Processing of an audio signal may be an operation of allocating directionality to the obtained audio signal. Processing of an audio signal may include, for example, change and/or conversion of an audio signal. According to an embodiment, the processor 350 may perform panning of an obtained audio signal, and may convert the same into a stereo audio signal. According to an embodiment, the processor 350 may perform rendering of an obtained audio signal, and may convert the same into three-dimensional sound (e.g., binaural sound) that provides a sense of space, a sense of position, and/or a sense of orientation. According to an embodiment, the processor 350 may process an audio signal to provide a sense of distance by adjusting the volume of an obtained audio signal. According to various embodiments, the processor 350 may process a single audio signal and may produce a signal (a left audio signal) that a listener listens to via the left ear and a signal (a right audio signal) that the listener listens to via the right ear, respectively. According to an embodiment, the processor 350 may process an audio signal by producing at least one of a difference in intensity, a difference in time, and a difference in phase between the sound of the left audio signal and the right audio signal.

According to an embodiment, the processor 350 may store a processed audio signal in a memory (e.g., the memory 340 of FIG. 3). According to an embodiment, the processor 350 may store a shot video image as video data, and may encode the same and the processed audio signal. According to an embodiment, the processor 350 may encode the processed audio signal as background audio data corresponding to the video, and may store the same. According to an embodiment, the processor 350 may encode the produced second location information, separately from the audio signal. For example, the processor 350 may encode the second location information and the audio signal, separately, and when reproduction is performed later, the processor 350 may decode the same again and may perform audio signal processing based on the second location information.

It is to be understood that, although FIG. 4 and the accompanying text as well as the description generally refer to an audio signal and a method of processing an audio signal, the application is not limited to this embodiment. For example, the audio signal can be any type of signal including, but not limited to, an audio signal, a video signal, a non-audio, non-video signal and a signal including metadata. The description refers to the audio signal for purposes of clarity and brevity.

FIGS. 5A-5C, FIGS. 6A and 6B, and FIGS. 7A and 7B are diagrams illustrating that an electronic device identifies a target object according to various embodiments.

FIGS. 5A-5C, FIGS. 6A and 6B, and FIGS. 7A and 7B may be examples of a video image that the electronic device 200 (e.g., the electronic device 101 of FIG. 1 and/or the electronic device 300 of FIG. 3) shoots at least one subject (e.g., the person 230 of FIG. 2 and/or the external electronic device 220) and displays the same in the display 210 (e.g., the display 330 of FIG. 3).

Figure 5A:
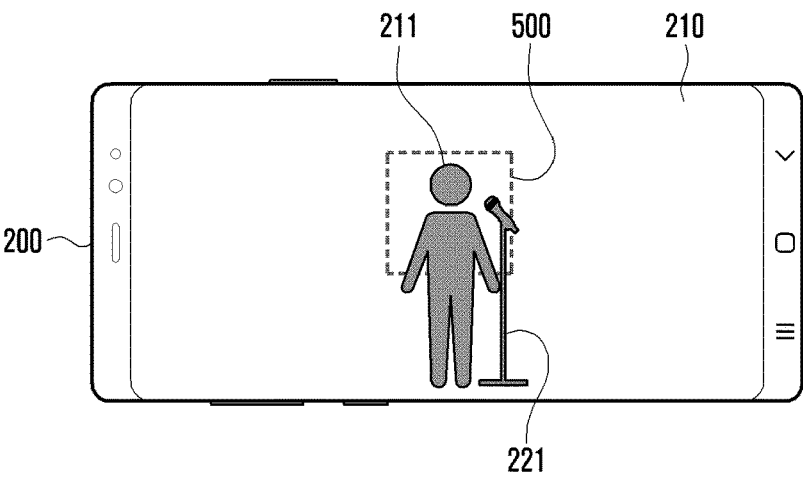
FIGS. 5A-5C, 6A and 6B, and 7A and 7B are diagrams illustrating that an electronic device identifies a target object according to various embodiments.
Figure 5B:
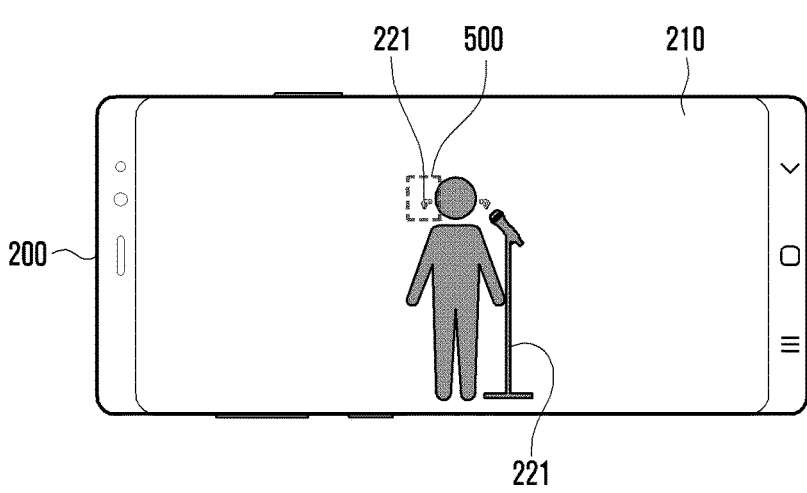
Figure 5C:
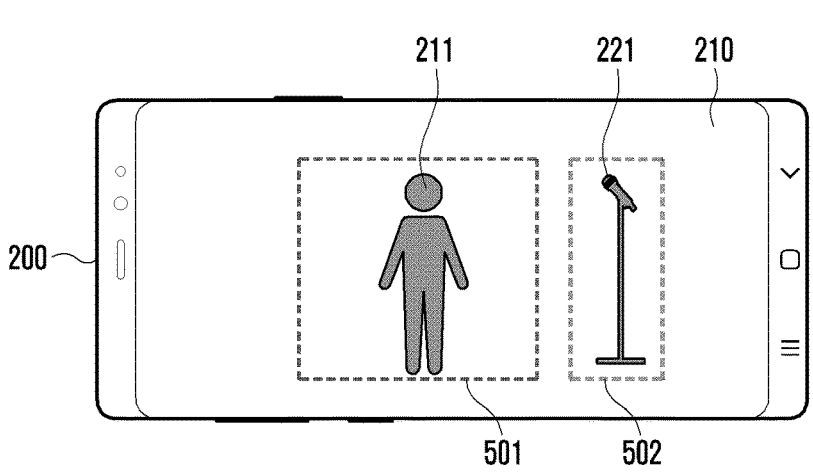

Referring to FIGS. 5A-5C, the electronic device 200 may analyze a video image displayed in the display 210, and may identify a target object.

According to various embodiments, a video image displayed in the electronic device 200 may include at least one object. The at least one object included in the video image may include, for example, a first object 211 that is an image object obtained by shooting a person subject (e.g., the person 230 of FIG. 2) and/or a second object 221 that is an image object obtained by shooting an external electronic device (e.g., the external electronic device 220 of FIG. 2). According to various embodiments, the electronic device 200 may analyze a shot video image or a video image and may identify at least one image object (e.g., the first object 211 and/or the second object 221) included in the video image. According to an embodiment, the electronic device 200 may analyze an image using an algorithm stored in advance in a memory (e.g., the memory 340 of FIG. 3), and may identify an object (e.g., the first object 211 and/or the second object 221) included in a video image via the image analysis. According to an embodiment, the electronic device 200 may analyze an image displayed in the display 210, and may identify an object (e.g., the first object 211 and/or the second object 221) included in the image. According to various embodiments, the electronic device 200 may analyze a shot video image, and may identify an object corresponding to a target (e.g., a target object). The target object may be, for example, an object that the electronic device 200 desires to estimate the actual location thereof. According to various embodiments, the electronic device 200 may identify a target object using image analysis. According to an embodiment, the electronic device 200 may analyze a video image and may perform face recognition, and may identify a person object (e.g., the first object 211) based on a face recognition result.

Referring to FIG. 5A, an object 500 that the electronic device 200 identifies may be the first object 211. According to an embodiment, the electronic device 200 may identify a person object (e.g., the first object 211) based on a face recognized by analyzing a video image. According to an embodiment, the electronic device 200 may identify the identified person object (e.g., the first object 211) as a target object.

Referring to FIG. 5B, the object 500 that the electronic device 200 identifies may be a second object 221. According to an embodiment, the electronic device 200 may identify a person object (e.g., the second object 221) based on a face recognized by analyzing a video image. According to an embodiment, the electronic device 200 may analyze a shot image and may identify a visual signal (e.g., a flickering LED signal), and may identify an object (e.g., the second object 221) corresponding to the external electronic device 200 as a target object. According to an embodiment, the external electronic device 220 may output a visual signal (e.g., an LED flickering signal), and the electronic device 200 may identify a signal of the external electronic device 220 and may identify an object corresponding to an image of the external electronic device 220. According to an embodiment, the electronic device 200 may identify an object (e.g., the second object 221) corresponding to the identified external electronic device 220 as a target object. According to various embodiments, the electronic device 200 may store a condition for identifying a target object in a memory (e.g., the memory 340 of FIG. 3) in advance. According to an embodiment, the electronic device 200 may produce sensor information using a sensor (e.g., the sensor module 176 of FIG. 1), may recognize an object (e.g., the second object 221) corresponding to the external electronic device 220 based on the sensor information, and may identify a target object based on a recognition result.

According to an embodiment, the electronic device 200 may receive information associated with the location of the external electronic device 200 using communication with the external electronic device 220, and may store the received location information. Referring to FIG. 5B, the external electronic device 220 may be in the state of continuously outputting a signal (e.g., a UWB signal) having a predetermined frequency. In this instance, the electronic device 200 may have a sensor (e.g., the sensor module 176 of FIG. 1) and, using a signal (e.g., a UWB signal) output from the external electronic device 220, may produce sensor information and may recognize the second object 221.

Referring to FIG. 5C, in case the electronic device 200 recognizes a plurality of image objects (e.g., the first object 211 and the second object 221), the electronic device 200 may select a target object among the recognized objects based on a predetermined condition. Referring to FIG. 5C, a plurality of objects may be identified (e.g., the first identified object 501 and the second identified object 502). According to an embodiment, the electronic device 200 may select at least one of the plurality of identified objects 501 and 502, and may identify the same as a target object. According to an embodiment, the electronic device 200 may identify the plurality of identified objects as target objects.

Referring to FIGS. 6A and 6B and FIGS. 7A and 7B, the electronic device 200 may identify a target object based on a touch input. According to various embodiments, the electronic device 200 may receive, from a user (not illustrated), a touch input via the display 210, and may identify a target object based on the received touch input. According to various embodiments, the display 210 of the electronic device 200 may include a touch panel (e.g., the input module 331 of FIG. 3), and may receive a user touch input via a touch panel (e.g., the input module 331). According to various embodiments, the electronic device 200 may receive a touch input, and may identify an area (e.g., the touch area 212) to which a touch is input. According to an embodiment, the electronic device 200 may identify the coordinates on the display 210 of the touch area 212. According to an embodiment, the electronic device 200 may variously configure the area of the touch area 212. Referring to FIGS. 6A and 6B and FIGS. 7A and 7B, the electronic device 200 may configure a touch area (e.g., the touch area 212 of FIG. 6) in a relatively small scope or a touch area (e.g., the touch area 212 of FIG. 7) in a relatively large scope. The electronic device 200 may configure, as the touch area 212, an area within a predetermined radius from a location at which a touch is input.

Figure 6A:
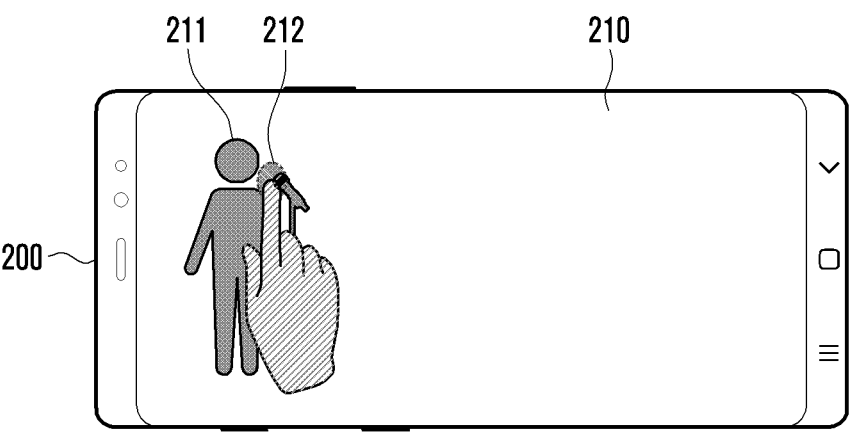
Figure 6B:
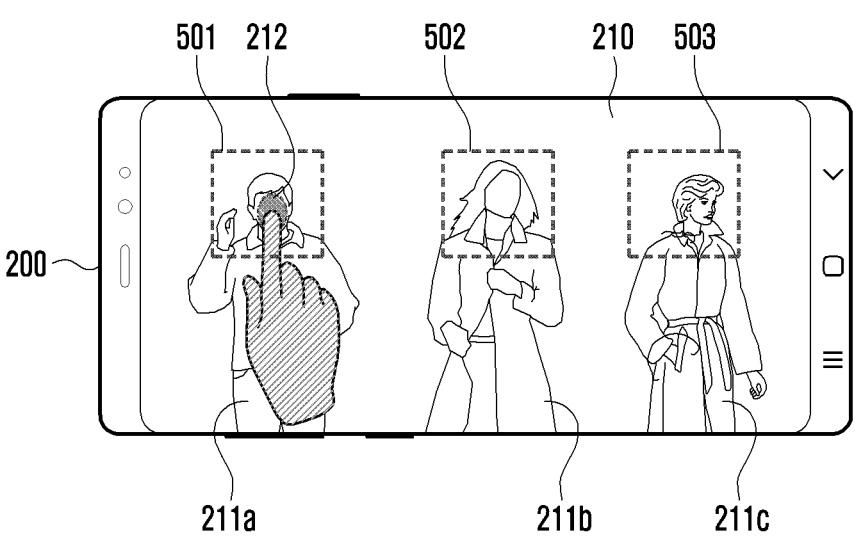

Referring to FIGS. 6A and 6B, for example, the electronic device 200 may recognize, as a target object, an object corresponding to the location of a touch input among the at least one recognized object. Referring to FIG. 6A and FIG. 6B, the electronic device 200 may receive a touch input. According to various embodiments, the electronic device 200 may receive a user touch input via the display 210. According to various embodiments, the electronic device 200 may identify the touch area 212 at which the touch input is received. According to an embodiment, the electronic device 200 may identify the touch area 212, and may identify a target object based on a location of the touch area 212 in the display 210. Referring to FIG. 6A, the electronic device 200 may display an image in the display 210, and the shot image may include the image object 211. According to an embodiment, the electronic device 200 may receive a touch input, and may identify the location of the touch area 212 at which the input is received. According to an embodiment, the electronic device 200 may identify the image object 211 existing in the substantially the same location as that of the touch area 212 as a target object based on the location of the touch area 212.

Referring to FIG. 6B, the electronic device 200 may display, in the display 210, a shot image including a plurality of image objects (e.g., a first object 211a, a second object 211b, and a third object 211c). According to various embodiments, the electronic device 200 may identify a target object (e.g., the target object 211a) that is a target among the plurality of image objects included in the shot image. According to an embodiment, the electronic device 200 may identify a target object based on a location of the touch area 212 among the plurality of objects (e.g., the first object 211a, the second 211b, and the third object 211c). According to an embodiment, via image analysis, the electronic device 200 may recognize a plurality of objects (e.g., the first object 211a, the second object 211b, and the third object 211c) included in an image displayed in the display 210. According to an embodiment, the plurality of objects (e.g., the first object 211a, the second 211b, and the third object 211c) recognized by the electronic device 200 may be a person image object. According to an embodiment, the electronic device 200 may recognize a person image object (e.g., the first object 211a, the second 211b, and the third object 211c) by analyzing an image. According to an embodiment, the electronic device 200 may identify the shape of a face included in an image of a person, and may identify a plurality of identified objects (e.g., a first identified object 501, a second identified object 502, and a third identified object 503) among the plurality of objects (e.g., the first object 211a, the second object 211b, and the third object 211c) included in the image. The identified objects (e.g., the first identified object 501, the second identified object 502, and the third identified object 503) may be objects that the electronic device 200 identifies among the plurality of objects in an image. According to an embodiment, the electronic device 200 may identify a target object based on locations of the identified objects (e.g., the first identified object 501, the second identified object 502, and the third identified object 503) and a location of the touch area 212. Referring to FIG. 6B, the electronic device 200 may identify, as a target object, the first identified object 501 that is closest to the touch area 212.

Figure 7A:
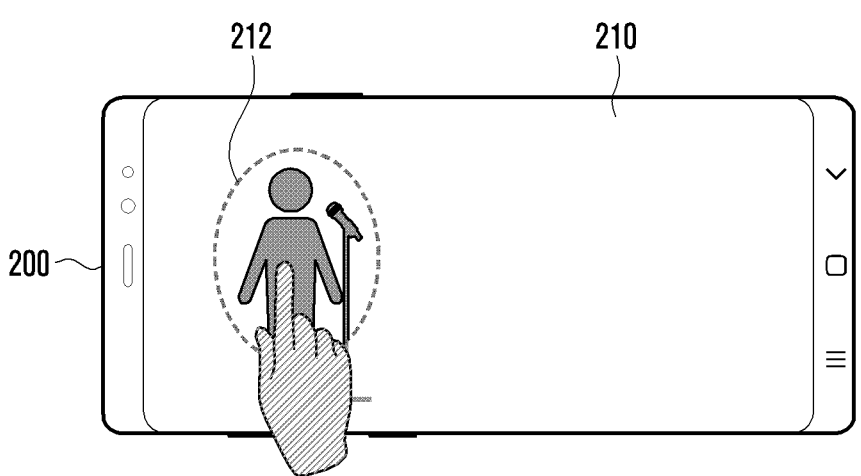
Figure 7B:
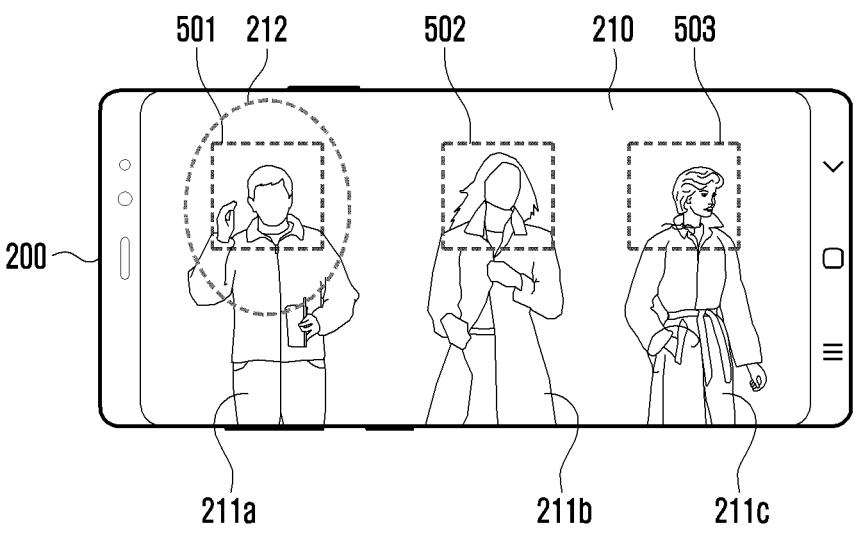

Referring to FIGS. 7A and 7B, the electronic device 200 may identify, as the touch area 212, an area having a range of a predetermined radius from a touch location. Referring to FIG. 7A and FIG. 7B, the touch area 212 may be an area having a predetermined area based on a location at which a touch is input in the display 210. According to various embodiments, the electronic device 200 may identify a target object based on the touch area 212. According to an embodiment, the electronic device 200 may identify, as a target object, an object existing in a location corresponding to the touch area 212. According to an embodiment, the electronic device 200 may identify, as a target object, an object existing in a location included in the touch area 212 or a location that overlaps or is closest to the touch area 212. Referring to FIG. 7B, the image that the electronic device 200 displays in the display 210 may include a plurality of objects (e.g., the first object 211a, the second object 211b, and the third object 211c). According to an embodiment, via image analysis, the electronic device 200 may identify the plurality of objects (e.g., the first object 211a, the second object 211b, and the third object 211c) in the display 210. The electronic device 200 may identify, as a target object, an object (e.g., the first object 211a) corresponding to the touch area 212 among the identified objects (e.g., the first identified object 501, the second identified object 502, and the third identified object 503). Referring to FIG. 7B, the electronic device 200 may identify that the first identified object 501 is included in the touch area 212, and may identify the first object 211*a* corresponding to the first identified object 501 as a target object.

Figure 8B:
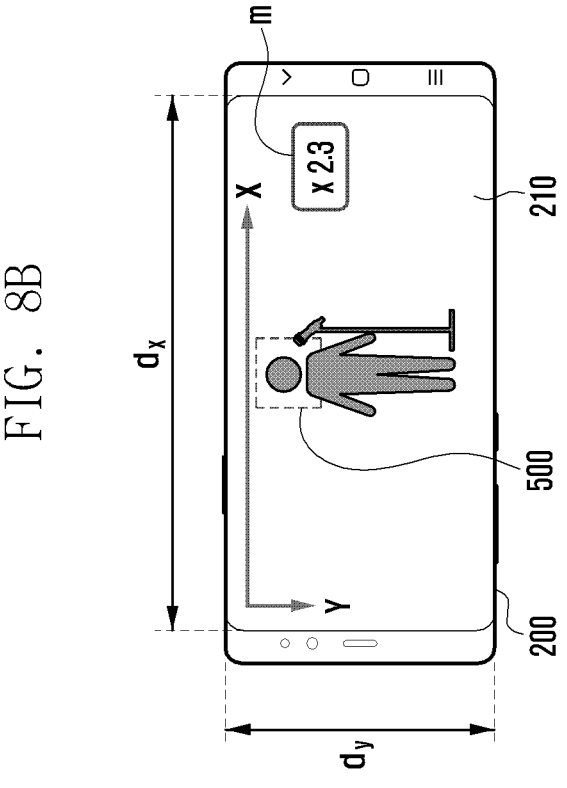
FIGS. 8A and 8B are diagrams illustrating additional information according to various embodiments.
Figure 8A:
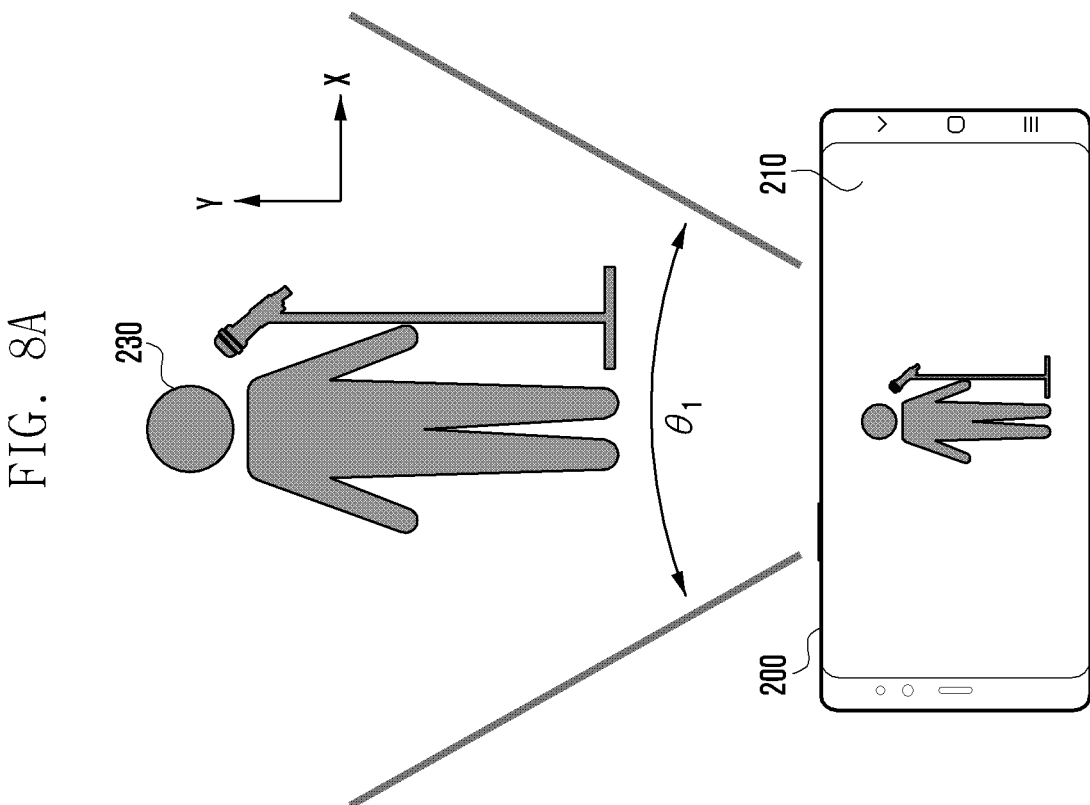

FIGS. 8A and 8B are diagrams illustrating additional information according to various embodiments.

According to various embodiments, the electronic device 200 may identify additional information. According to various embodiments, a processor (e.g., the processor 350 of FIG. 3) may identify the additional information. The additional information may be information used for estimating information (e.g., second location information) related to an actual location of a subject (e.g., the external electronic device 220 or the person 230) corresponding to a target object, other than first location information. The additional information may include information configured in a camera module (e.g., the camera module 320 of FIG. 3) included in the electronic device 300. According to various embodiments, the additional information may include information associated with a state and/or configuration of the camera module 320 such as the field of view (FOV) (e.g., a first angle (θ1)) and/or a magnification (m) of the camera module 320 that is performing shooting.

Referring to FIGS. 8A and 8B, the electronic device 200 may be shooting a video of the subject 230. According to an embodiment, the electronic device 200 may shoot a video using a camera module (e.g., the camera module 320 of FIG. 3).

Referring to FIG. 8A, the camera module 320 of the electronic device 200 may form a field of view (FOV) of a predetermined angle (e.g., a first angle (θ1)). According to an embodiment, the camera module 320 may include at least one lens (not illustrated), and may form a FOV (e.g., first angle (θ1)) used for shooting based on a bore that at least one lens has and/or a magnification. The electronic device 200 may store information associated with a FOV in advance in a memory (e.g., the memory 340 of FIG. 3).

Referring to FIG. 8B, the electronic device 200 may identify information associated with a magnification (m) configured for the camera module 320 that is currently performing shooting, and may identify coordinate information associated with a location of the identified object 500 (e.g., a target object) in a display. According to an embodiment, the electronic device 200 may identify a location at which the identified object 500 is displayed at a length of dx in the x-axis and at length of dy in the y-axis of the display 210. According to an embodiment, the electronic device 200 may identify magnification (m) information applied to an image. The information associated with the magnification (m) may be information associated with an expansion rate when the electronic device 200 shoots a video. According to various embodiments, the additional information may include field of view (FOV) and/or magnification information, and based on the FOV and/or magnification information, the electronic device 200 may calculate an angle at which an object (e.g., a target object) deviates from the center of the display 210 (e.g., an angle of altitude in the vertical direction and/or an azimuth in the left or right direction) and may produce actual location information (e.g., the second location information).

FIGS. 9A and 9B are diagrams illustrating a stereo sound according to various embodiments.

Figure 10:
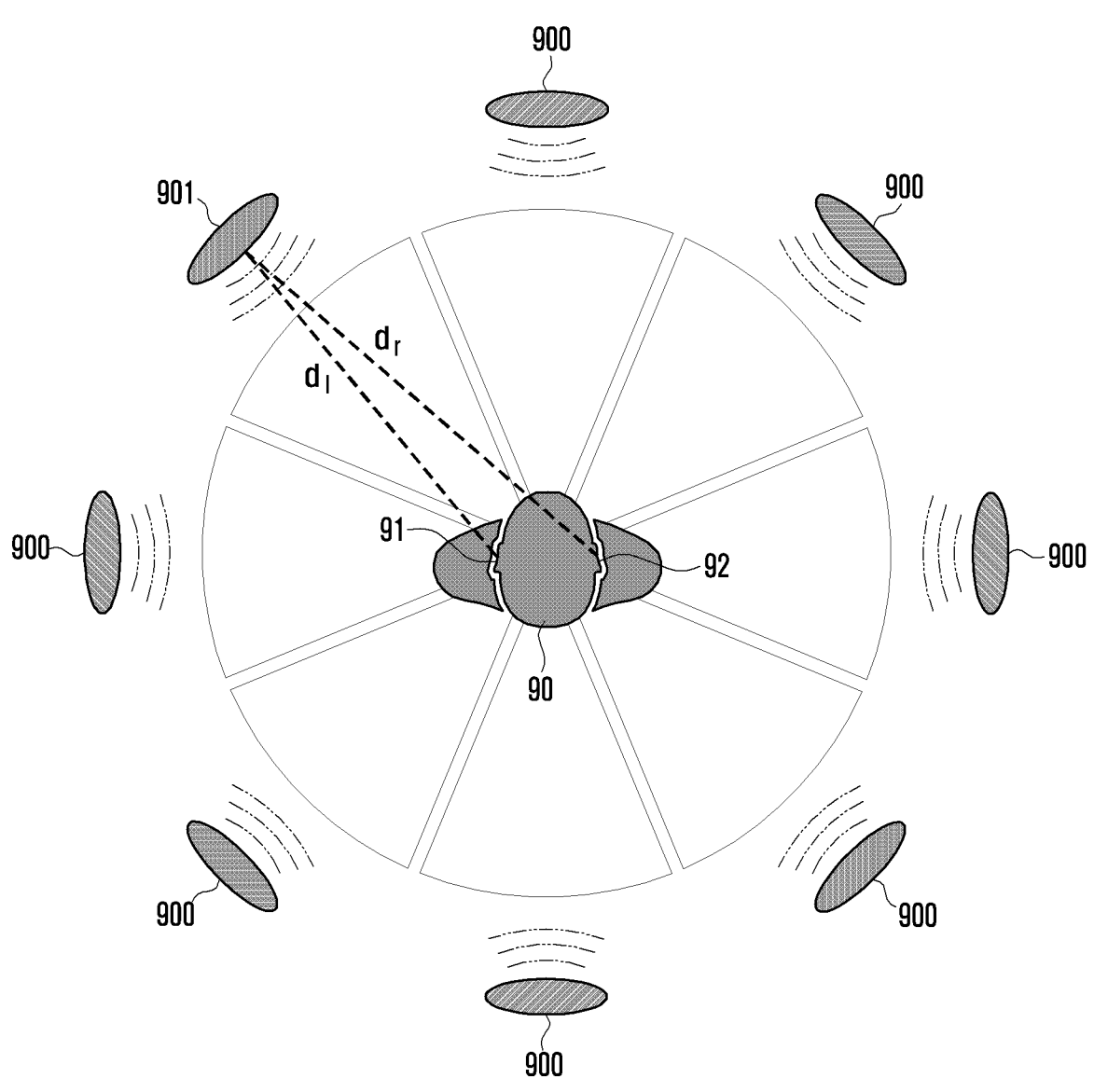
FIGS. 10 and 11A and 11B are diagrams illustrating an audio signal to which a sense of space is applied according to various embodiments
Figure 11B:
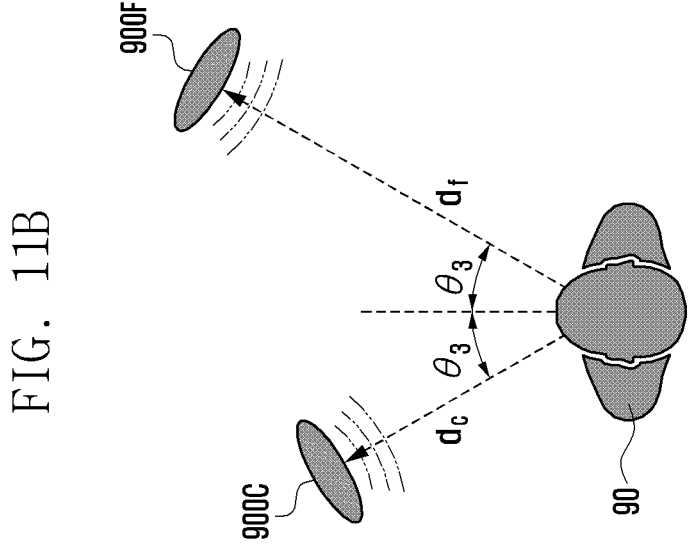
Figure 11A:
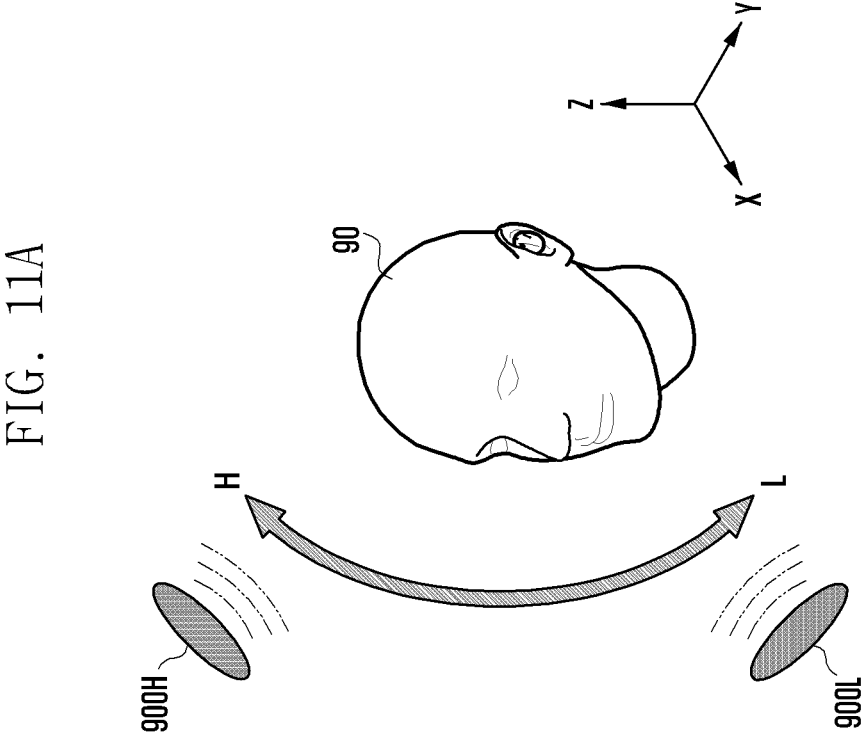

FIG. 10 and FIGS. 11A and 11B are diagrams illustrating an audio signal to which a sense of space is applied according to various embodiments.

Referring to FIG. 9A and FIG. 9B, a listener 90 may listen to sound. According to an embodiment, the listener 90 may be listening to audio using an audio output device such as earphones. According to various embodiments, while listening to sound, the listener 90 may recognize that a sound source is present within a predetermined distance and/or in a predetermined direction, and a sound image 900 or an acoustic image may be formed in a virtual location corresponding to the distance and/or direction. According to an embodiment, when the sound image 900 is formed, the listener 90 may feel as if the listener 90 would be in a space (e.g., an acoustic field) where the sound source is present. For example, when the sound image 900 is formed, the listener 90 may feel that an acoustic field is present, that is, may feel a sense of acoustic field.

Referring to FIG. 9A, the listener 90 may be listening to an audio signal corresponding to mono sound. A mono audio signal may be a signal that outputs the same audio to the left ear and the right ear. The same audio may be understood as audio at the same phase, audio having the same volume, and/or audio at the same point in time. Referring to FIG. 9A, a mono audio signal may form only a single first sound image 910. The first sound image 910 may be formed in front of a user to be a predetermined space apart from the user.

Referring to FIG. 9B, FIG. 10, and FIGS. 11A and 11B, the listener 90 may be listening to an audio signal corresponding to stereo sound. A stereo audio signal may be a signal that outputs different audio to the left ear and the right ear, respectively. The different audio may be understood as audio at different phases, audio having different volumes, and/or audio at different points in time. That is, the stereo audio signal may be an audio signal that has a difference in phase, a difference in volume, and/or a difference in time between audio that reaches the left ear and audio that reaches the right ear. According to various embodiments, a stereo audio signal may include at least two sound images (e.g., a left second sound image 920L and a right second sound image 920R).

Referring to FIG. 9B, it is the case that a stereo audio signal forms two sound images (e.g., the left second sound image 920L and the right second sound image 920R). According to an embodiment, the left second sound image 920L and the right second sound image 920R may be spaced apart from the front of the listener by the same angle (e.g., θ2). According to an embodiment, the left second sound image 920L and the right second sound image 920R may be spaced apart from the listener 90 by substantially the same distance. According to various embodiments, the electronic device (e.g., the electronic device 300 of FIG. 3) may produce a stereo audio signal. According to an embodiment, the electronic device 300 may process an audio signal to produce a stereo audio signal. In case of producing a stereo audio signal, the electronic device 300 may produce a stereo audio signal based on second location information. According to an embodiment, the second location information may include only a left or right azimuth formed by a target object or a left or right distance. The left or right azimuth or the left or right distance may be an angle or a distance that the target object is spaced apart from the center of the electronic device 300 in the left or right direction. According to an embodiment, the electronic device 300 may process an audio signal based on the left or right azimuth or the left or right distance of the target object. The electronic device 300 may produce the left sound and the right sound to be different, that is, may perform panning, based on the left or right azimuth or the left or right distance.

Referring to FIG. 10, the sound images 900 and 901 of a stereo audio signal may be formed in all direction from the center of the listener 90. In this instance, two or more sound images 900 and 901 may be formed. In this instance, it is understood that a stereo audio signal forms a binaural signal. According to various embodiments, a binaural audio signal may form a sense of orientation. Referring to FIG. 10, the distance from a sound image (e.g., the fourth sound image 901) at a predetermined location to the left ear 91 of the listener 90 and the distance to the right ear of the listener 90 may correspond to dL and dr, respectively. In this instance, the volume of audios that reach the left ear 91 and the right ear 92 may be determined in inverse proportion to dL and dr, respectively. In addition, the periods of time spent while audios reach the left ear 91 and the right ear 92 may be determined in proportion to dL and dr, respectively. According to various embodiments, to form, from an audio signal, a sound image (e.g., the fourth sound image 901) at a predetermined location, the electronic device 300 may process an audio signal by forming a difference in volume and/or a difference in time between sounds that reach the left ear 91 and the right ear 92, respectively, based on configured distances to the left ear 91 and the right ear 92. In this instance, the electronic device 300 may produce an audio signal to which a sense of orientation is assigned based on second location information. According to an embodiment, the second location information may include a left or right azimuth formed by a target object, a left or right distance, and/or a distance from the electronic device 300. According to an embodiment, the electronic device 300 may assign a sense of orientation to an audio signal, that is, may perform rendering, based on the second location information.

Referring to FIGS. 11A and 11B, an audio signal may form a sense of orientation in the vertical direction and a sense of distance. Referring to FIG. 11A, the listener 90 may listen to an audio signal having a sense of orientation formed in the vertical direction, and sound images (e.g., an upper sound image 900H and a lower sound image 900L) may be formed in an upper position and the lower position. According to various embodiments, in case the electronic device 300 adjusts (e.g., equalizing) the overall frequency characteristic of an audio signal, and processes the same in a high-frequency area, the electronic device may form a sound image in an upper position (the upper sound image 900H), and processes the same in a low-frequency area, the electronic device may form a lower sound image 900L. In this instance, the electronic device 300 may perform vertically rendering of an audio signal based on the second location information including the upper or lower position.

Referring to FIG. 11B, a sound image (e.g., a short-distance sound image 900C and a long-distance sound image 900F) may form a sense of distance. FIG. 11B illustrates two sound images (e.g., a short-distance sound image 900C and a long-distance sound image 900F) that are spaced apart from the front of the listener 90 by the same angle (θ3). According to an embodiment, the short-distance sound 900C may be spaced apart from the listener 90 by a dc distance, and the long-distance sound image 900F may be spaced apart from the listener 90 by a df distance. According to an embodiment, the electronic device 300 may process an audio signal to include an audio that reaches each of the left ear and the right ear by applying the volume that is inverse proportional to the corresponding distance (e.g., dc and df). According to an embodiment, the electronic device 300 may produce the second location information including distance information, and may process an audio signal to include sound images corresponding to different distances based on the different distance information. According to various embodiments, the electronic device 300 may process an audio signal so that the degrees of bias to the left or the right are different depending on the locations where the sound images are formed. For example, although the short-distance sound image 900C and the long-distance sound image 900F are spaced apart from the listener 90 by the same angle (θ3), the listener 90 may feel as if the degrees of bias to the left or the right would be different depending on distances. The listener 90 may feel as if the degree of bias to the left or right of the short-distance sound image 900C would be greater than the degree of bias to the left or right of the long-distance image 900F. According to an embodiment, the electronic device 300 may determine the degree of bias in inverse proportion to a distance (dc) to a short-distance sound image and a distance (df) to a long-distance sound image, and may process the audio signal (e.g., panning).

Figure 12:
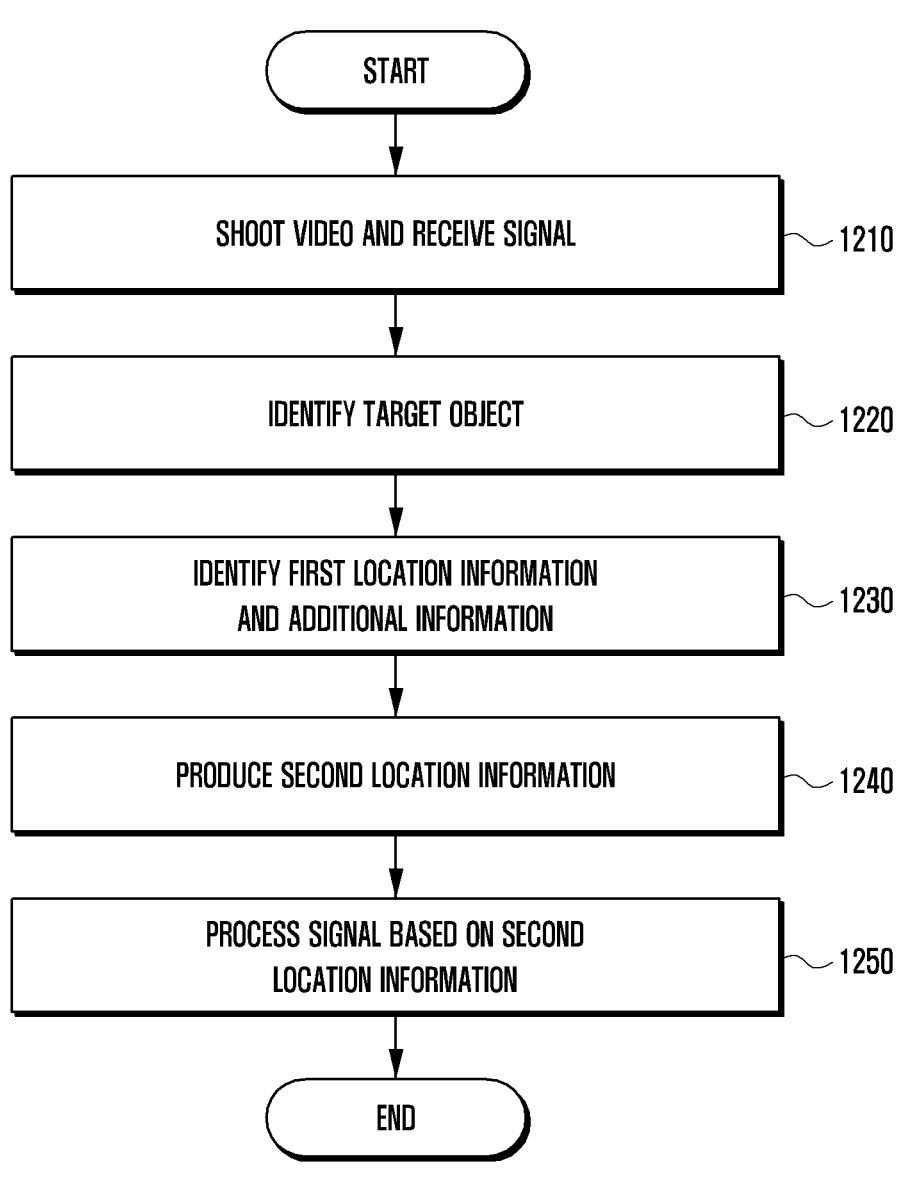
FIG. 12 is a flowchart illustrating operation of applying directionality to a signal by an electronic device according to various embodiments.

FIG. 12 is a flowchart illustrating operation of applying directionality to a signal, such as an audio signal, a video signal, a non-audio and non-video signal and a signal including metadata, by an electronic device according to various embodiments.

Referring to FIG. 12, each of a series of operations that an electronic device (e.g., the electronic device 300 of FIG. 3) performs to process a signal may be expressed as an operation performed by a processor (e.g., the processor 350 of FIG. 3) included in the electronic device 300.

Referring to operation 1210, the processor 350 may shoot a video and may receive a signal. The processor 350 may shoot images of various subjects (e.g., the external electronic device 220 and/or the person 230 of FIG. 2). According to various embodiments, the processor 350 may shoot at least one subject (e.g., the external electronic device 220 and/or the person 230) using a camera module (e.g., the camera module 320 of FIG. 3). Various objects, such as the person 230, a device (e.g., the external electronic device 220), and the like, may be used as subjects. The objects used as subjects are not limited, but for ease of description, descriptions will be provided with reference to the case that uses at least one person and/or at least one external electronic device as a subject, in the document. According to various embodiments, the processor 350 may shoot a subject (e.g., the person 230 and/or the external electronic device 220) and may produce an image of the shot subject. According to various embodiments, the processor 350 may display the shot image in a display (e.g., the display 330 of FIG. 3). According to an embodiment, the image shot by the processor 350 may be a video image. According to various embodiments, the processor 350 may display a video image in the display 330. According to various embodiments, the processor 350 may configure a connection with an external electronic device (e.g., the external electronic device 220 of FIG. 2). According to various embodiments, the processor 350 may establish a connection communicatively with the external electronic device 220. According to various embodiments, the processor 350 may establish a connection with the external electronic device 220 in a wired manner (e.g., direct communication) and/or using a wireless communication network (e.g., the first network 198 of FIG. 1). According to an embodiment, the processor 350 may connect the external electronic device 220 via short-distance wireless communication (e.g., Bluetooth). According to various embodiments, the processor 350 may transmit, to the external electronic device 220, data needed for establishing a communication connection and/or needed for performing a function, or may receive data from the external electronic device 220. According to various embodiments, the processor 350 may obtain a signal. According to various embodiments, in case of shooting a video, the processor 350 may obtain a signal corresponding to background elements of an image. The processor 350 may receive input of a video from the outside using a microphone (e.g., the input module 150 of FIG. 1) included in the processor 350, and may produce a signal. According to an embodiment, the processor 350 may receive a signal from the connected external electronic device 220. For example, the external electronic device 220 may produce a signal using collected voices, and may transmit the produced signal to the processor 350. The processor 350 may receive a signal from the external electronic device 220. According to an embodiment, the processor 350 may receive a signal of a voice corresponding to an image from the external electronic device 220, simultaneously with shooting an image. According to an embodiment, the signal that the processor 350 receives from the external electronic device 220 may be mono sound.

In operation 1220, the processor 350 may identify a target object. According to various embodiments, the processor 350 may analyze the shot video image, and may identify an object (e.g., a target object) corresponding to a target. The target object may be, for example, an object that the processor 350 desires to estimate the actual location thereof. According to various embodiments, the processor 350 may display the shot video image in the display 330. The video image that the processor 350 displays may include at least one object. The at least one object included in the video image, for example, a first object (e.g., the first object 211 of FIG. 2) that is an image object obtained by shooting a person (e.g., the person 230 of FIG. 2) and/or a second object (e.g., the second object 221 of FIG. 2) that is an image object obtained by shooting the external electronic device 220. According to various embodiments, the processor 350 may analyze a shot video image or a video image, and may identify at least one image object (e.g., the first object 211 and/or the second object 221 of FIG. 2) included in the video image. According to an embodiment, the processor 350 may analyze an image using an algorithm stored in advance in a memory (e.g., the memory 340 of FIG. 3), and may identify an object (e.g., the first object 211 and/or the second object 221) included in a video image via the image analysis. According to an embodiment, the processor 350 may analyze an image displayed in the display 210, and may identify an object (e.g., the first object 211 and/or the second object 221) included in the image.

According to various embodiments, the processor 350 may identify s target object using image analysis. According to an embodiment, the processor 350 may analyze a video image and may perform face recognition, and may identify a person object (e.g., the first object 211) based on a face recognition result. According to an embodiment, the processor 350 may identify the identified person object (e.g., the first object 211) as a target object. According to an embodiment, the processor 350 may identify an object (e.g., the second object 221) corresponding to the identified external electronic device 220 as a target object. According to an embodiment, the electronic device 350 may analyze a shot image and may identify a visual signal (e.g., a flickering LED signal), and may identify an object (e.g., the second object 221) corresponding to the external electronic device 200 as a target object. According to various embodiments, the processor 350 may store a condition for identifying a target object in a memory (e.g., the memory 340 of FIG. 3) in advance. According to an embodiment, the processor 350 may receive a touch input from a user (not illustrated) via the display 210, and may identify a target object based on the received touch input. For example, an object corresponding to the location of a touch input among the at least one recognized object may be recognized as a target object. According to an embodiment, the processor 350 may produce sensor information using a sensor (e.g., the sensor module 176 of FIG. 1), may recognize the external electronic device 220 or the person 230 based on the sensor information, and may identify a target object based on a recognition result. According to an embodiment, the processor 350 may receive information related to the location of the external electronic device 200 using communication with the external electronic device 220, and may store the received location information. According to various embodiments, the processor 350 may identify a target object based on at least one of analysis of a shot video image, analysis of a received touch input, sensor information, and received location information.

Referring to operation 1230, the processor 350 may identify first information and additional information. The first location information may be information associated with a location at which a target object is displayed in the display 210. According to an embodiment, the first location information may be information expressed as predetermined coordinates in the display 210. According to various embodiments, the processor 350 may identify information (e.g., coordinates) (e.g., first location information) associated with a location at which each identified object (e.g., the first object 211 and/or the second object 221) is displayed in the display 210. According to various embodiments, the processor 350 may continuously identify coordinates (e.g., first location information) at which each identified object (e.g., the first object 211 and/or the second object 221) is displayed in the display 210. While performing shooting, the processor 350 may identify the coordinates (e.g., first location information) of an object (e.g., the first object 211 and/or the second object 221) that moves in real time in the display 210. According to an embodiment, the first location information may be information that varies in real time while the processor 350 is shooting a video. According to an embodiment, the processor 350 may continuously and immediately identify the first location information while shooting a video. According to various embodiments, the processor 350 may identify a location (e.g., first location information) at which a target object is displayed in the display 210. According to an embodiment, in the display 210, the processor 350 may identify the locations (e.g., first location information) of all objects (e.g., the first object 211 and the second object 221) existing in the display 210. According to an embodiment, the processor 350 may identify a location (first location information) of a target object (e.g., the first object 211 or the second object 221) in the display 210 among at least one image object (e.g., the first object 211 and/or the second object 221) displayed in the display 210.

According to various embodiments, the processor 350 may identify the additional information. The additional information may be information used for estimating information (e.g., second location information) related to an actual location of a subject (e.g., the external electronic device 220 or the person 230) corresponding to a target object, other than the first location information. The additional information may include information configured in a camera module (e.g., the camera module 320 of FIG. 3) included in the electronic device 300. According to various embodiments, the additional information may include information related to a state and/or configuration of the camera module 320, such as a field of view (FOV) and/or a magnification of the processor 350 that is performing shooting.

In operation 1240, the processor 350 may produce second location information. The second location information may be information related to an actual location of a subject (e.g., the person 230 and/or the external electronic device 220 of FIG. 2). According to various embodiments, the processor 350 may estimate the location of a subject (e.g., the person 230 and/or the external electronic device 220 of FIG. 2). According to an embodiment, the processor 350 may estimate actual locations of subjects (e.g., the person 230 and the external electronic device 220) corresponding to all objects (e.g., the first object 211 and the second object 221) included in the shot video image. According to an embodiment, the processor 350 may estimate only an actual location of a subject (e.g., the person 230 and/or the external electronic device 220) corresponding to a target object. According to an embodiment, the processor 350 may estimate an actual location of the subject corresponding to the target object, and may produce second location information related to the estimated location. According to various embodiments, the processor 350 may produce the second location information based on the first location information. According to an embodiment, the processor 350 may identify a location (e.g., first location information) of a shot image object (e.g., a target object) in the display 210, and may estimate an actual location (e.g., second location information) based on the location in the display 210. According to various embodiments, the processor 350 may produce the second location information based on additional information. According to an embodiment, the processor 350 may estimate an actual location of a subject (e.g., the person 230 and/or the external electronic device 220) using the first location information of a target object and additional information. According to an embodiment, an actual location estimated by the processor 350 may be a location of a subject (e.g., the person 230 or the external electronic device 220) relative to the location of the processor 350. According to an embodiment, the processor 350 may produce the second location information based on sensor information produced by a sensor (e.g., the sensor module 176 of FIG. 1) included in the electronic device 300. According to an embodiment, the processor 350 may receive location information of the external electronic device 220 from the external electronic device 220, and may produce the second location information based on the received location information. According to an embodiment, the second location information may be one-dimensional location information that expresses only a location biased to the left or the right, or may include the forward or backward position (e.g., a distance) relative to the processor 350, or may be three-dimensional location information that expresses a location biased to the upper or lower position relative to the processor 350. According to various embodiments, the second location information may include at least one of the forward or backward position, the left or right position, and the upper or lower position in association with a subject, or a combination thereof.

Referring to operation 1250, the processor 350 may process the signal based on the second location information. Processing of a signal may be an operation of allocating directionality to the obtained signal. Processing of a signal may include, for example, change and/or conversion of a signal. According to an embodiment, the processor 350 may perform panning of an obtained signal, and may convert the same into a stereo signal. According to an embodiment, the processor 350 may perform rendering of an obtained signal, and may convert the same into three-dimensional sound (e.g., binaural sound) that provides a sense of space, a sense of position, and/or a sense of orientation. According to an embodiment, the processor 350 may process an signal to provide a sense of distance by adjusting the volume of an obtained signal. According to various embodiments, the processor 350 may process a single signal and may produce a signal (a left signal) that a listener listens to via the left ear and a signal (a right signal) that the listener listens to via the right ear, respectively. According to an embodiment, the processor 350 may process a signal by producing at least one of a difference in intensity, a difference in time, and a difference in phase between the sound of the left signal and the right signal.

According to an embodiment, the processor 350 may store a processed signal in a memory (e.g., the memory 340 of FIG. 3). According to an embodiment, the processor 350 may store a shot video image as video data, and may encode the same and the processed signal. According to an embodiment, the processor 350 may encode the processed signal as background data corresponding to the video, and may store the same. According to an embodiment, the processor 350 may encode the produced second location information, separately from the signal. For example, the processor 350 may encode the second location information and the signal, separately, and when reproduction is performed later, the processor 350 may decode the same again and may perform signal processing based on the second location information.

An electronic device (e.g., the electronic device 300) according to various embodiments of the disclosure may include a communication module 310 configured to support short-distance wireless communication, a camera module 320 configured to shoot a video image, a display 330 configured to display the video image being shot, and a processor 350 operatively connected to the communication module, the camera module, and the display, and the processor may be configured to establish a connection with an external electronic device (e.g., the external electronic device 220) using the communication module, to receive an audio signal from the external electronic device simultaneously with shooting the video image, to identify a target object that is a target among at least one object (e.g., the first object 211a, the second object 211b, and/or the third object 211c) included in the video image being shot, to identify first location information related to a location at which the target object is displayed in the display, to estimate an actual location of the target object based on the first location information, produce second location information related to the actual location, and to process the audio signal based on the produced second location information.

In addition, the processor may be configured to recognize at least one object included in the video image and to identify a target object among the at least one recognized object.

In addition, the display may further include an input module 331 configured to receive a touch input, and the processor may be configured to receive the touch input, to identify a location of the received touch input in the display, and to identify the target object based on the identified location (e.g., the touch area 212) of the touch input.

In addition, the processor may be configured to analyze an image of the at least one object, and to identify the target object based on the image analysis.

In addition, the processor may be configured to recognize, at least one image among an image of the external electronic device and a face image of the at least one object based on the image analysis, and to identify the target object based on the recognized image.

In addition, the processor may be configured to further identify additional information including magnification information of the camera module and field of view information of the camera module, and to produce the second location information based on the identified additional information and the first location information.

In addition, the electronic device may be configured to further receive location information of the external electronic device from the external electronic device, and the processor may be configured to produce the second location information based on the location information of the external electronic device.

In addition, the electronic device may further include a sensor (e.g., the sensor module 176), and the processor may be configured to detect, using the sensor, a signal produced from the external electronic device, and to produce the second location information based on the detected signal.

In addition, the second location information may include a left or right distance or a left or right azimuth, and the processor may be configured to process the audio signal by performing panning of the audio signal based on the second location information.

In addition, the second location information may further include up or down information, and the processor may be configured to process the audio signal by performing three-dimensional rendering of the audio signal based on the second location information.

In addition, the second location information may further include a distance from the target object to the electronic device, and the processor may be configured to adjust volume of the audio signal based on the actual location.

In addition, the electronic device may further include a memory (e.g., the memory 340) storing data and operatively connected to the processor, and the processor may be configured to encode the processed audio signal and the shot video image and to store the same in the memory.

A method of processing an audio signal by an electronic device (e.g., the electronic device 300) according to various embodiments of the disclosure, the method may include an operation of establishing a connection with an external electronic device (e.g., the external electronic device 220), an operation of receiving an audio signal from the external electronic device simultaneously with shooting a video image, an operation of identifying a target object that is a target among at least one object (e.g., the first object 211*a*, the second object 211*b*, and/or the third object 211*c*) included in the video image being shot, an operation of identifying first location information associated with a location at which the target object is displayed in a display of the electronic device, an operation of estimating an actual location of the target object based on the first location information, producing second location information related to the actual location, and processing the audio signal based on the produced second location information.

In addition, the operation of identifying the target object may further include an operation of recognizing at least one object included in the video image and an operation of identifying the target object among the at least one recognized object.

In addition, the operation of identifying the target object may include an operation of receiving a touch input, an operation of identifying a location of the received touch input in the display, and an operation of identifying the target object based on the identified location of the touch input.

In addition, the operation of identifying the target object may include an operation of identifying an image of the at least one object, and an operation of identifying the target object based on the image analysis In addition, the operation of producing the second location information may include an operation of further identifying additional information including magnification information of a camera module (e.g., the camera module 320) included in the electronic device and field of view information of the camera module, and an operation of producing the second location information based on the identified additional information and the first location information.

In addition, the second location information may include a left or right distance or a left or right azimuth, and the operation of processing the audio signal by performing panning of the audio signal based on the second location information.

In addition, the second location information may further include a height, and the operation of processing the audio signal by performing three-dimensional rendering of the audio signal based on the second location information.

In addition, the second location information may further include a distance between the target object and the electronic device, and the operation of processing the audio signal may include an operation of adjusting the audio signal based on the second location information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication module configured to support short-distance wireless communication;
a camera module configured to shoot a video image;
a display configured to display the video image; and
a processor operatively connected to the communication module, the camera module, and the display, and configured to:
connect with an external electronic device using the communication module;
receive an audio signal from the external electronic devices while shooting the video image;
identify a target object among at least one object included in the video image;
identify first location information related to a location at which the target object is displayed in the video image;
identify additional information including at least one of magnification information of the camera module or field of view (FOV) information of the camera module;
estimate an actual location of the target object based on the first location information and the additional information;
produce second location information related to the actual location; and
process the audio signal based on the produced second location information.

2. The electronic device of claim 1, wherein the processor is configured to:
recognize at least one object included in the video image as at least one recognized object; and
identify a target object among the at least one recognized object.

3. The electronic device of claim 1, wherein the display further comprises an input module configured to receive a touch input, and
wherein the processor is configured to:
receive the touch input;
identify a location of the touch input in the display; and
identify the target object based on the identified location of the touch input.

4. The electronic device of claim 1, wherein the processor is configured to:
analyze an image of the at least one object using image analysis; and
identify the target object based on the image analysis.

5. The electronic device of claim 4, wherein the processor is configured to:
recognize at least one image among an image of the external electronic device and a face image of the at least one object as a recognized image based on the image analysis; and
identify the target object based on the recognized image.

6. The electronic device of claim 1, further comprising:
a sensor,
wherein the processor is configured to:
detect, using the sensor, a detected signal produced from the external electronic device; and
produce the second location information based on the detected signal.

7. The electronic device of claim 1, wherein the second location information comprises a left or right distance or a left or right azimuth, and
wherein the processor is configured to process the audio signal by performing panning of the audio signal based on the second location information.

8. The electronic device of claim 7, wherein the second location information further comprises up or down information,
wherein the processor is configured to process the audio signal by performing three-dimensional (3D) rendering of the audio signal based on the second location information.

9. The electronic device of claim 7, wherein the second location information further comprises a distance from the target object to the electronic device, and wherein the processor is configured to adjust volume of the audio signal based on the actual location.

10. The electronic device of claim 1, further comprising a memory storing data and operatively connected to the processor, wherein the processor is configured to:

encode the processed audio signal as an encoded processed audio signal and the shot video image as an encoded shot video image; and store the encoded processed audio signal and the encoded shot video image in the memory.

11. A method of processing an audio signal by an electronic device, the method comprising:

connecting with an external electronic device;

receiving an audio signal from the external electronic device while shooting a video image;

identifying a target object among at least one object included in the video image;

identifying first location information associated with a location at which the target object is displayed in the video image;

identifying additional information including at least one of magnification information of a camera module of the electronic device or field of view (FOV) information of the camera module;

estimating an actual location of the target object based on the first location information and the additional information;

producing second location information related to the actual location; and processing the audio signal based on the produced second location information.

12. The method of claim 11, wherein the identifying of the target object comprises:

recognizing at least one object included in the video image as at least one recognized object; and identifying the target object among the at least one recognized object.

13. The method of claim 11, wherein the identifying of the target object comprises:

receiving a touch input;

identifying a location of the touch input in the display as an identified location of the touch input; and identifying the target object based on the identified location of the touch input.

14. An electronic device comprising:

a camera module configured to shoot a video image;

a display configured to display the video image; and a processor configured to:

receive a signal simultaneously with shooting the video image;

identify a target object among at least one object included in the video image;

identify first location information related to a location at which the target object is displayed in the video image;

estimate an actual location of the target object based on the first location information;

identify additional information including at least one of magnification information of the camera module or field of view (FOV) information of the camera module;

produce second location information related to the actual location; and process the signal based on the produced second location information.

15. The electronic device of claim 14, wherein the signal comprises at least one of an audio signal, a video signal, a non-audio and non-video signal and a signal comprising metadata.

16. The electronic device of claim 14, wherein the processor is configured to process the signal by applying directionality to the signal.

17. The electronic device of claim 14, wherein the display is receptive of a touch input and the processor is configured to:

identify a location of the touch input in the display as an identified location of the touch input; and identify the target object based on the identified location of the touch input.

18. The electronic device of claim 14, wherein the processor is configured to:

analyze an image of the at least one object using image analysis; and identify the target object based on the image analysis.

* * * * *